(12) United States Patent
Hasebe

(10) Patent No.: US 7,614,655 B2
(45) Date of Patent: Nov. 10, 2009

(54) AIRBAG DEVICE

(75) Inventor: Masahiro Hasebe, Minato-ku (JP)

(73) Assignee: Takata Corporation, Tokyo (JP)

( * ) Notice: Subject to any disclaimer, the term of this patent is extended or adjusted under 35 U.S.C. 154(b) by 411 days.

(21) Appl. No.: 11/460,764

(22) Filed: Jul. 28, 2006

(65) Prior Publication Data

US 2007/0024032 A1    Feb. 1, 2007

(30) Foreign Application Priority Data

Jul. 29, 2005    (JP)    ............... 2005-221245

(51) Int. Cl.
*B60R 21/233*    (2006.01)
*B60R 21/237*    (2006.01)

(52) U.S. Cl. ................... 280/743.1; 280/729
(58) Field of Classification Search ........... 280/729, 280/730.1, 743.1; 493/458, 459
See application file for complete search history.

(56) References Cited

U.S. PATENT DOCUMENTS

| | | | |
|---|---|---|---|
| 6,834,886 | B2 | 12/2004 | Hasebe et al. |
| 7,370,880 | B2 * | 5/2008 | Hasebe ................. 280/729 |
| 2004/0160048 | A1 | 8/2004 | Hasebe et al. |
| 2005/0212275 | A1 | 9/2005 | Hasebe |
| 2007/0007755 | A1 * | 1/2007 | Bauer et al. ............ 280/729 |

FOREIGN PATENT DOCUMENTS

| | | |
|---|---|---|
| EP | 1 364 838 A2 | 11/2003 |
| EP | 1 452 304 A1 | 9/2004 |
| EP | 1 580 083 A2 | 9/2005 |
| JP | 10-71911 | 3/2006 |

OTHER PUBLICATIONS

A search report dated Nov. 15, 2006, from the European Patent Office in corresponding European Application No. 06013375.8-2421.

* cited by examiner

*Primary Examiner*—Ruth Ilan
(74) *Attorney, Agent, or Firm*—Fitch, Even, Tabin & Flannery

(57) ABSTRACT

An airbag device is provided wherein the airbag device is made by folding an airbag having a left airbag section and a right airbag section by a new folding method. In one form, an airbag includes a left airbag section and a right airbag section that are inflated on the left and right, respectively, in front of a passenger, and a base chamber that communicates one ends of the airbag sections and with each other. The left airbag section and the right airbag section are made to a secondary folded body that is flat in the right-and-left direction and is elongated in forward and rearward directions. Then, the bags are finally folded by being roll-folded from the leading ends toward the base end parts thereof.

24 Claims, 23 Drawing Sheets

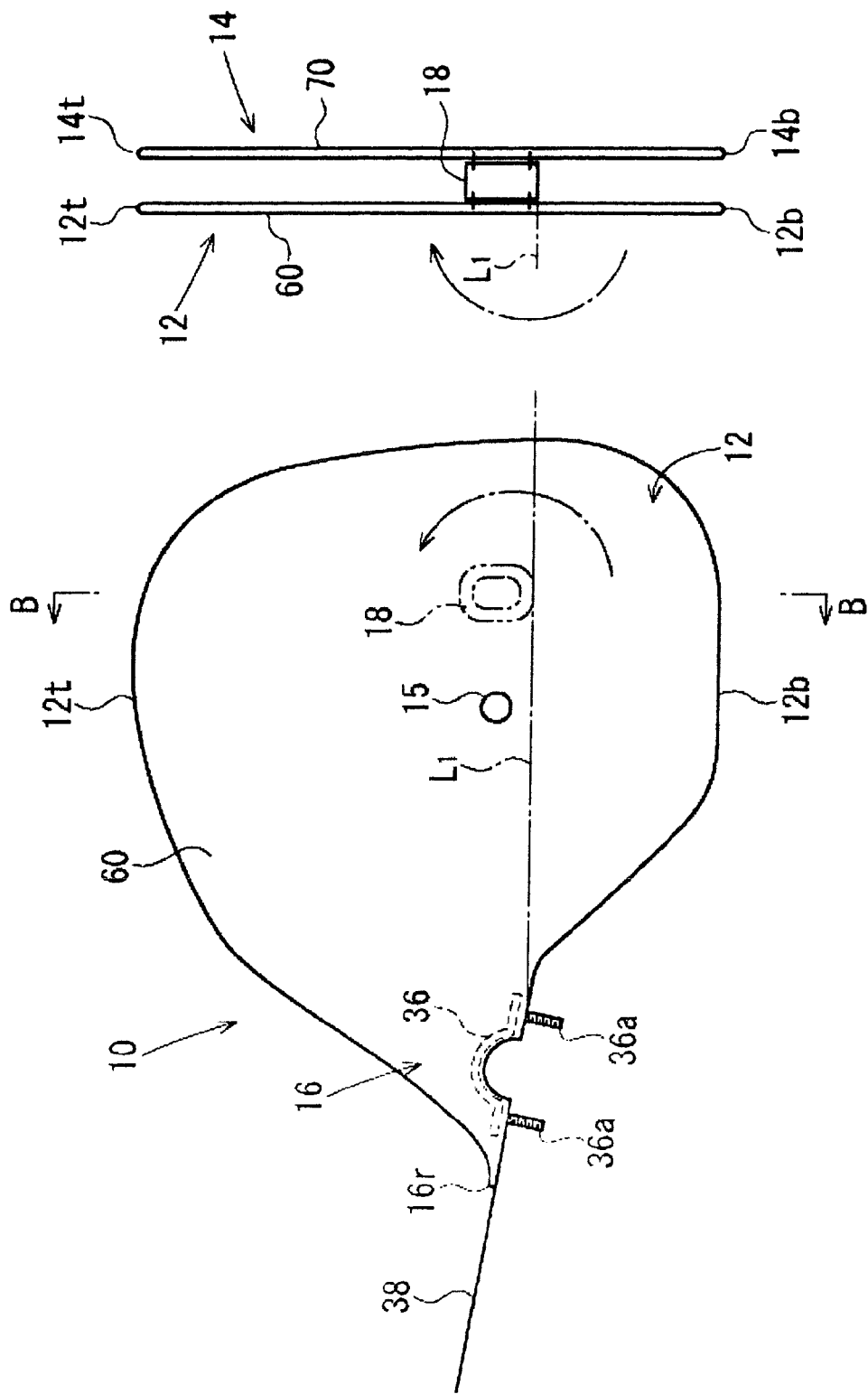

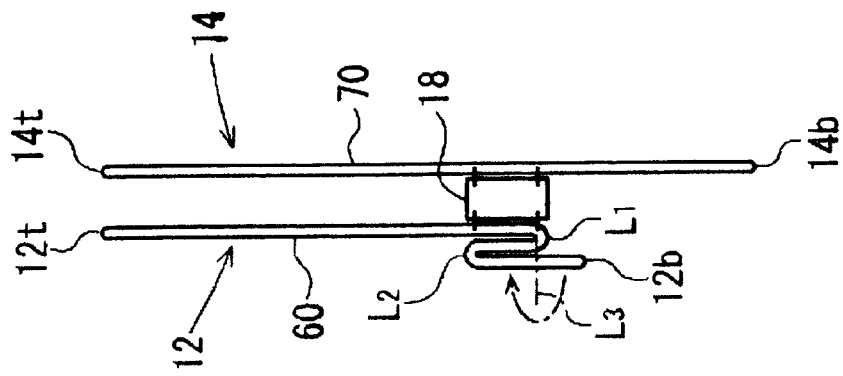
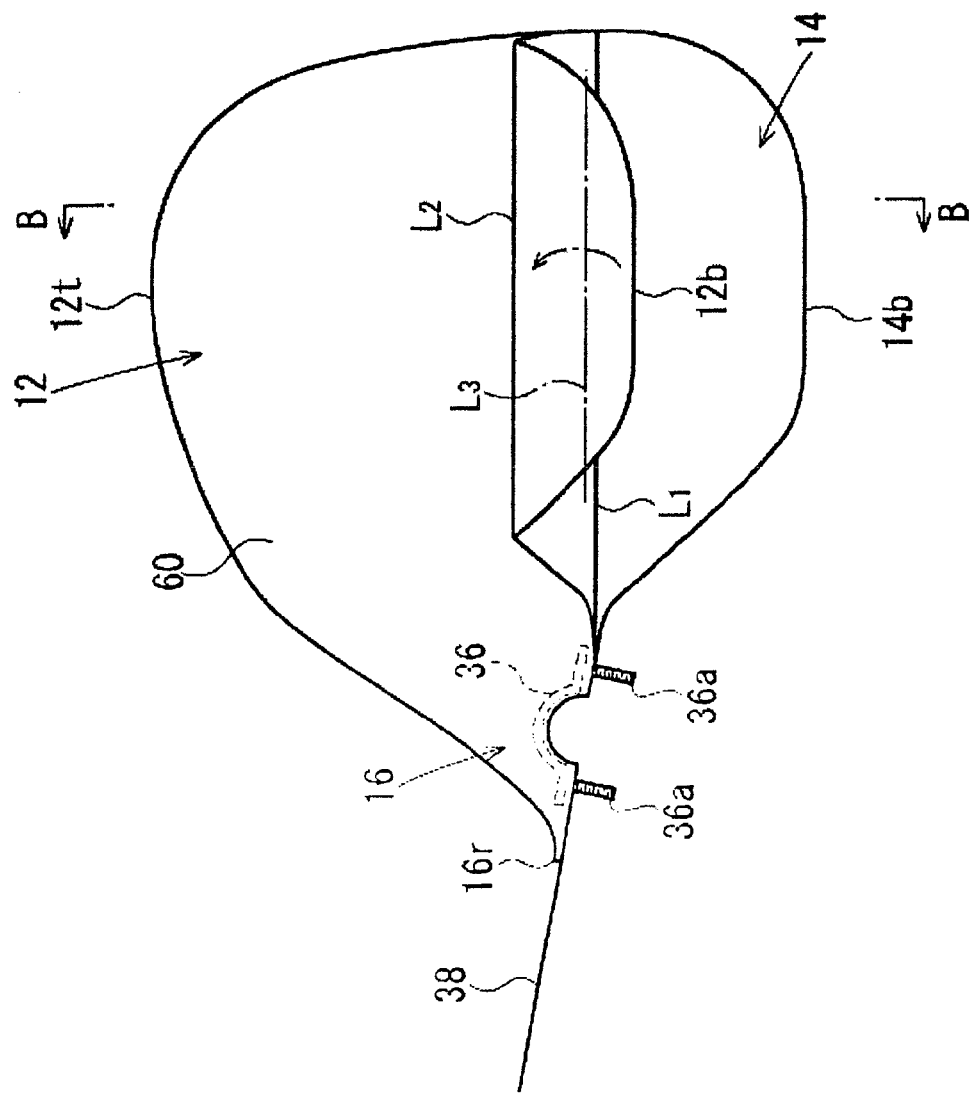

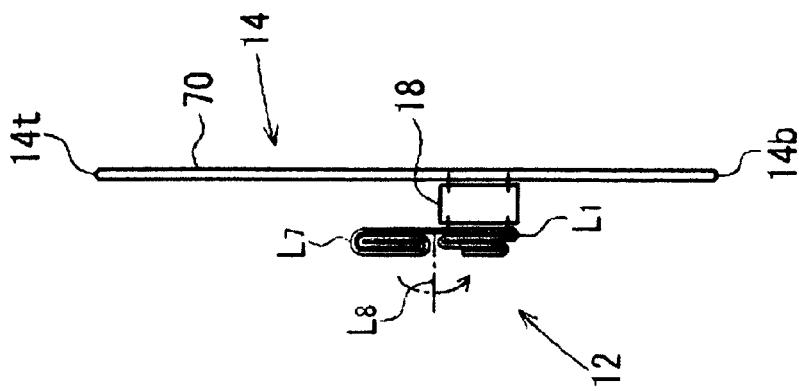
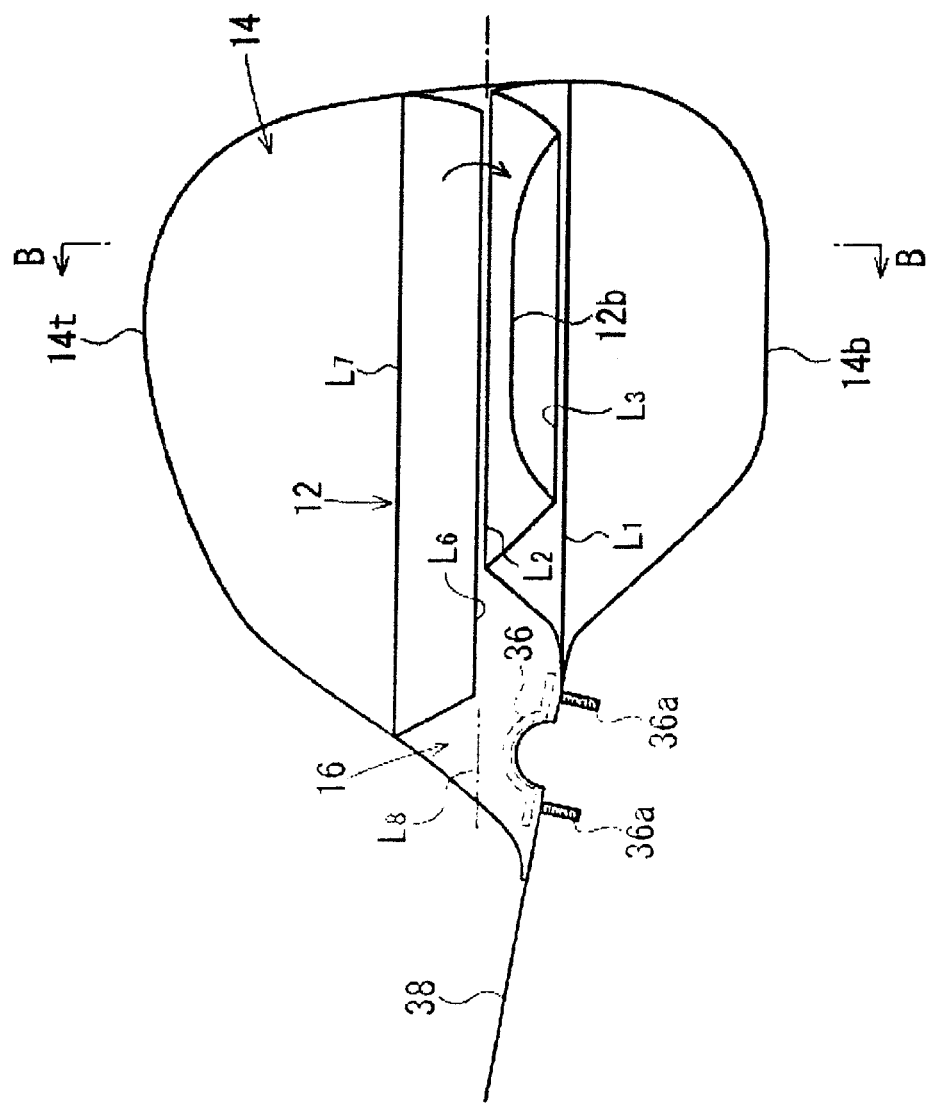
FIG. 9A
FIG. 9B

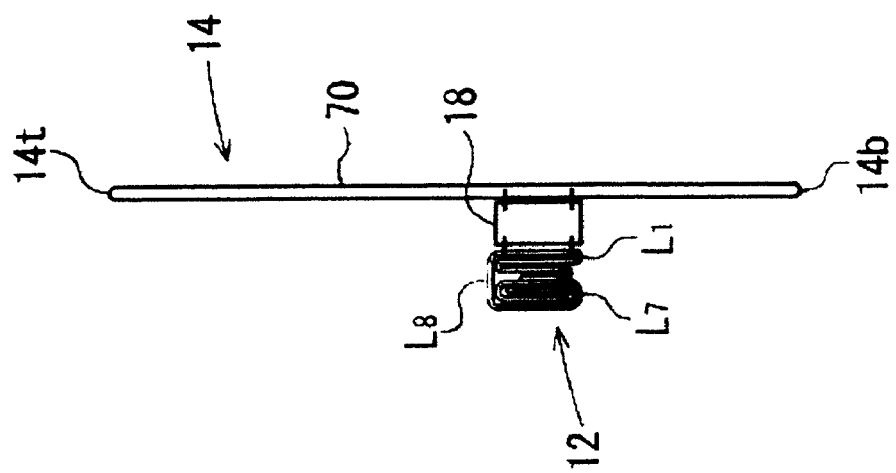
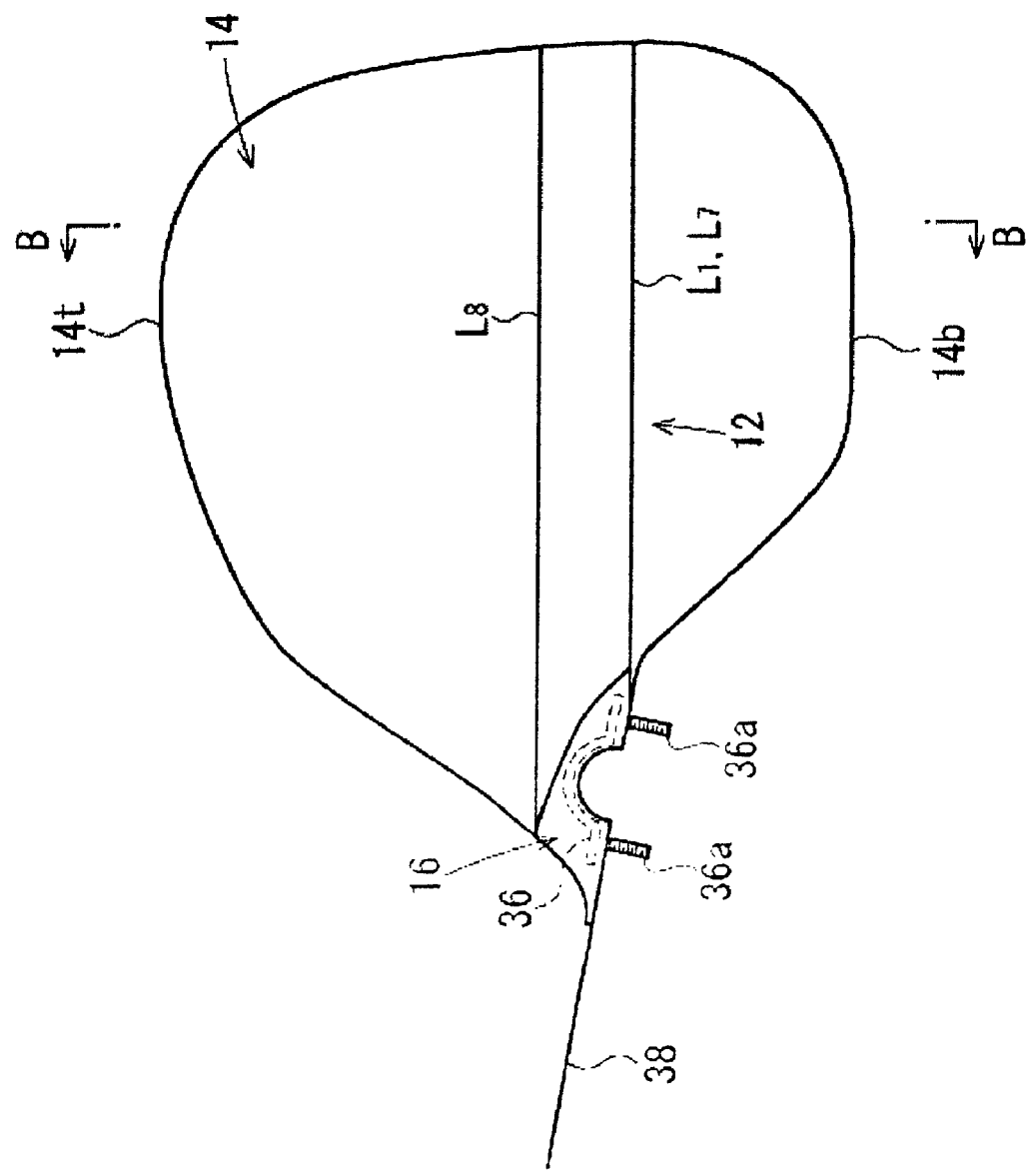

AIRBAG DEVICE

FIELD OF THE INVENTION

The present invention relates to an airbag device including an airbag that is inflated at the time of a vehicle collision to receive a passenger, and more specifically, it relates to an airbag device including an airbag having a left airbag section and a right airbag section that are inflated on the right and left, respectively, in front of a passenger.

BACKGROUND OF THE INVENTION

Japanese Unexamined Patent Application Publication No. 2004-268903 discloses an airbag for receiving a passenger at the time of a vehicle collision and a folding method thereof. The airbag has a left airbag section and a right airbag section that are inflated on the right and left, respectively, in front of a passenger, and adapted to be inflated by an inflator common to the airbag sections. In the airbag disclosed in the publication, the left airbag section and the right airbag section are not connected to each other at their leading ends, and longitudinal middle portions of the airbag sections are connected by a connecting part.

In the above publication, portions of the airbag sections closer to the leading ends than the connecting part are folded along vertical folding lines, respectively, so as to be primary folded bodies. Then, the primary folded bodies are folded to be smaller.

This airbag is folded and accommodated within a case and covered with a cover. When the inflator (gas generator) begins to discharge gas at the time of a vehicle collision, the airbag is inflated toward the front of a passenger while pushing the cover open.

SUMMARY OF THE INVENTION

Accordingly, the object of the present invention is to provide an airbag device made by folding an airbag which has a left airbag section and a right airbag section with a folding method different from that disclosed in Japanese Unexamined Patent Application Publication No. 2004-268903.

An airbag device according to a first form of the invention includes a folded airbag, a case accommodating the airbag, and an inflator for inflating the airbag. The airbag at a leading-end side is inflated in a direction away from a base-end side thereof by gas discharged from the inflator disposed on the base-end side. The airbag includes a base end part having a gas introducing port that receives gas from the inflator, a left airbag section that is connected to the base end part and inflated on the left in front of a passenger, and a right airbag section that is connected to the base end part and inflated on the right in front of the passenger. The left airbag section and the right airbag section have leading ends which are not connected to each other, whereby a space to be opened toward the passenger is formed between the leading ends of the left airbag section and the right airbag section which have been inflated. Middle portions of the left airbag section and the right airbag section in their inflation direction are connected to each other by a connecting part, and middle portions of the left airbag section and the right airbag section in the up-and-down direction in an inflation state are connected to each other by the connecting part. The left airbag section and the right airbag section of the airbag are deployed to be flat in the up-and-down direction so that left and right side surfaces thereof are overlapped with each other, and an upper portion and a lower portion of the left airbag section and the right airbag section, which are located on the upper and lower sides of the connecting part, are folded and overlapped on the side surfaces of the left airbag section and the right airbag section opposite to the connecting part, and thus the left airbag section and the right airbag section are formed in the shape of a strip of which the strip face faces in the up-and-down direction and the shape is elongated in forward and rearward directions, thereby forming primary folded bodies. Each of the primary folded bodies of the left airbag section and the right airbag section is formed in the shape of a strip of which the strip face faces in the left-and-right direction and the shape is elongated in forward and rearward directions, thereby forming a secondary folded body. The secondary folded body of the left airbag section and the right airbag section is folded from the leading ends thereof toward the base end part so as to have a small width in forward and rearward directions, thereby forming a final folded body.

The airbag device according to a second form of the invention is an airbag device according to the first form in which the secondary folded body of the left airbag section and the right airbag section is folded by a roll folding, an accordion-like folding or the combination thereof, thereby forming a final folded body.

In the airbag of the airbag device, each of the primary folded bodies of the left airbag section and the right airbag section is formed in the shape of a strip of which the strip face faces in the left-and-right direction and the shape is elongated in forward and rearward directions, thereby forming a secondary folded body. Accordingly, each of the primary folded bodies is finally folded so as to have a small width in forward and rearward directions. With this purpose, various folding methods may be employed as a final method of folding the airbag. The shape of the airbag in the course of the inflation of the airbag is different due to the final method of folding the airbag. Accordingly, it is possible to take a shape in the course of the inflation of the airbag depending on the vehicle model (an angle of an instrument panel or a windshield) by selecting a proper folding method.

As disclosed in the second form of the invention, a roll folding, an accordion-like folding or the combination thereof may be used as the final method of folding the airbag. Here, the final method of folding the airbag is not limited.

BRIEF DESCRIPTION OF THE DRAWINGS

FIGS. 5(*a*) and 5(*b*) are explanatory views showing the process of folding the airbag in FIG. 1.

FIGS. 7(*a*) and 7(*b*) are explanatory views showing the process of folding the airbag in FIG. 1.

FIGS. 9(*a*) and 9(*b*) are explanatory views showing the process of folding the airbag in FIG. 1.

FIGS. 10(*a*) and 10(*b*) are explanatory views showing the process of folding the airbag in FIG. 1.

DETAILED DESCRIPTION OF THE PREFERRED EMBODIMENTS

Hereinafter, an embodiment of the present invention will be described with reference to the accompanying drawings.

Figure 1:
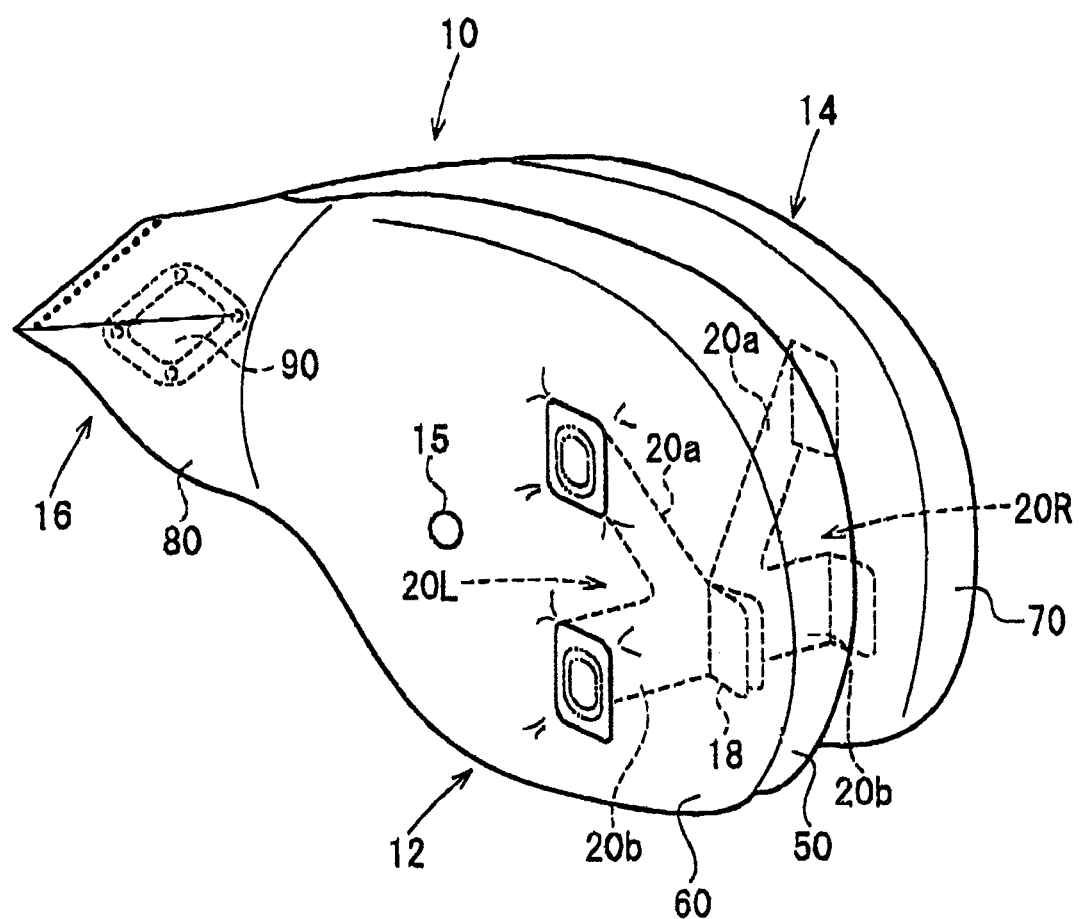
FIG. 1 is a perspective view of an airbag according to an embodiment of the invention.
Figure 2:
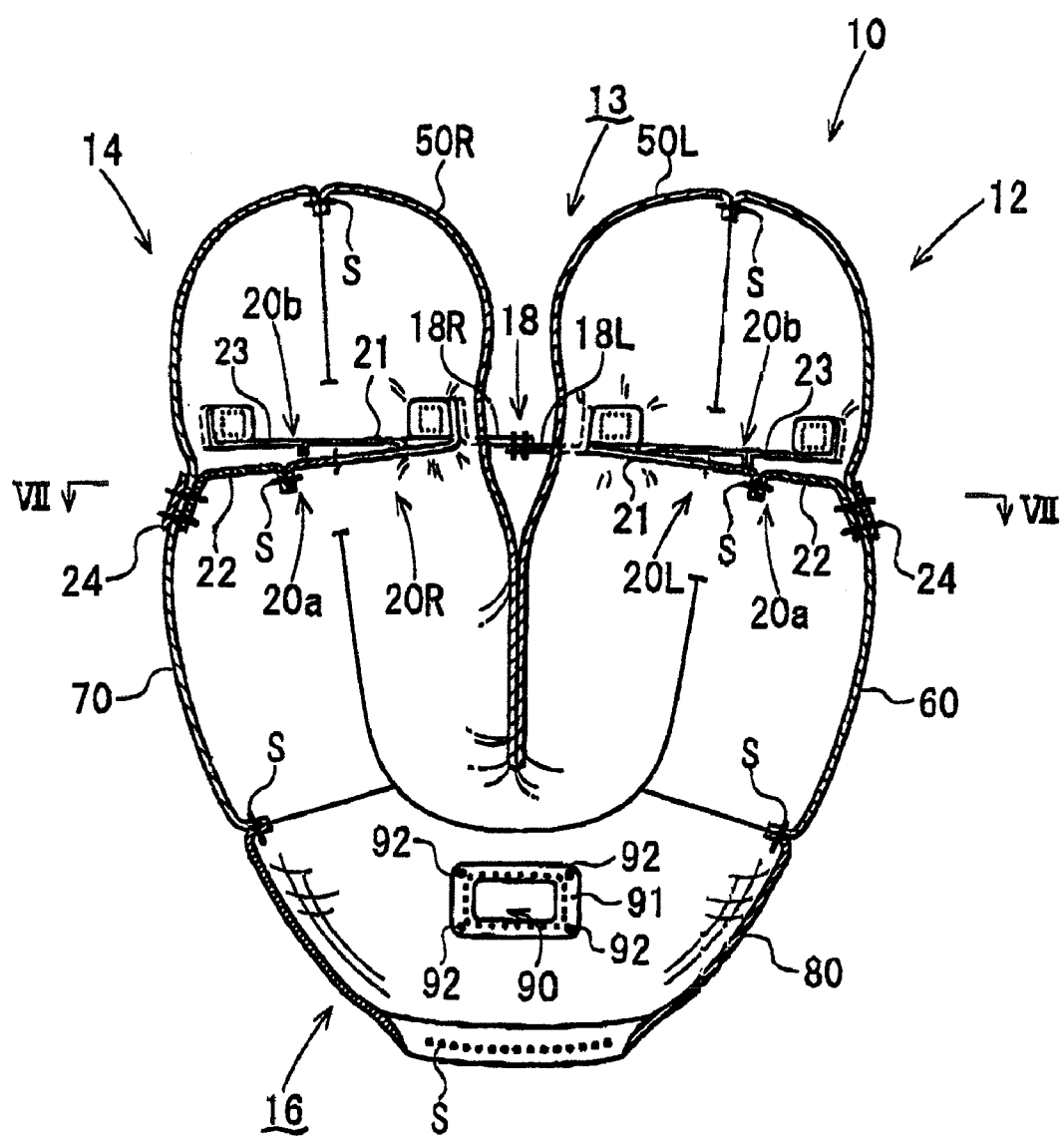
FIG. 2 is an horizontal sectional view of the airbag in FIG. 1.
Figure 3:
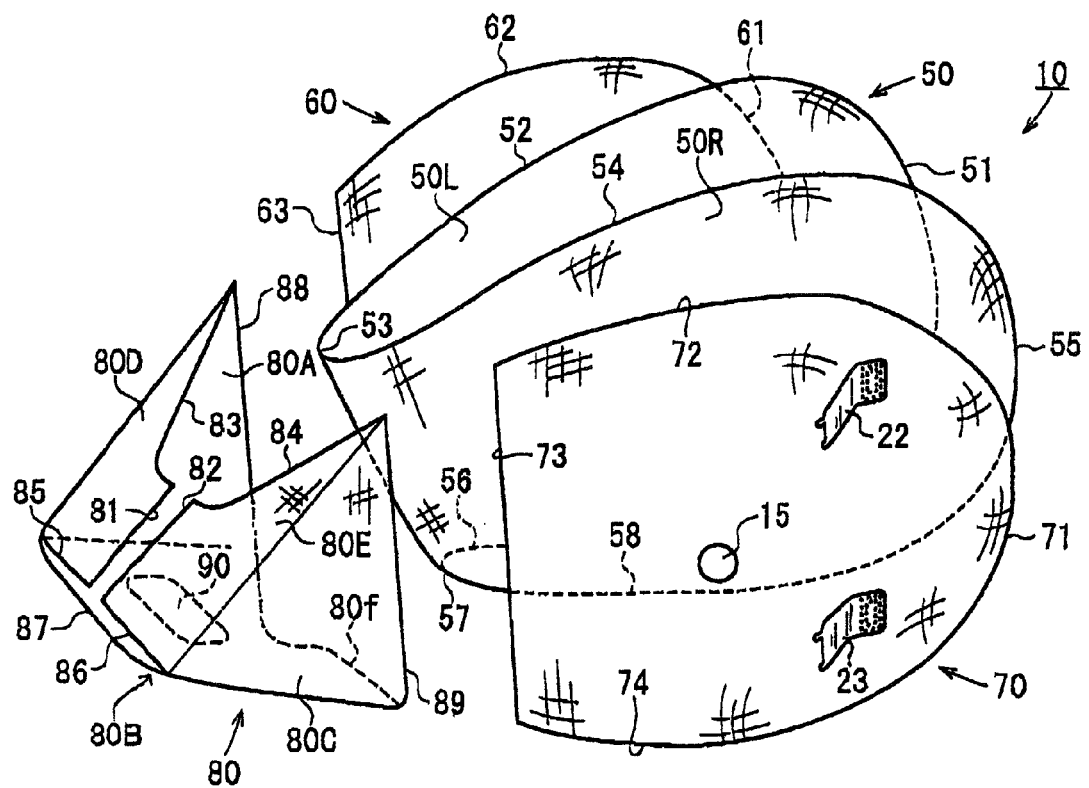
FIG. 3 is an exploded perspective view showing the structure of panels of the airbag in FIG. 1.
Figure 4:
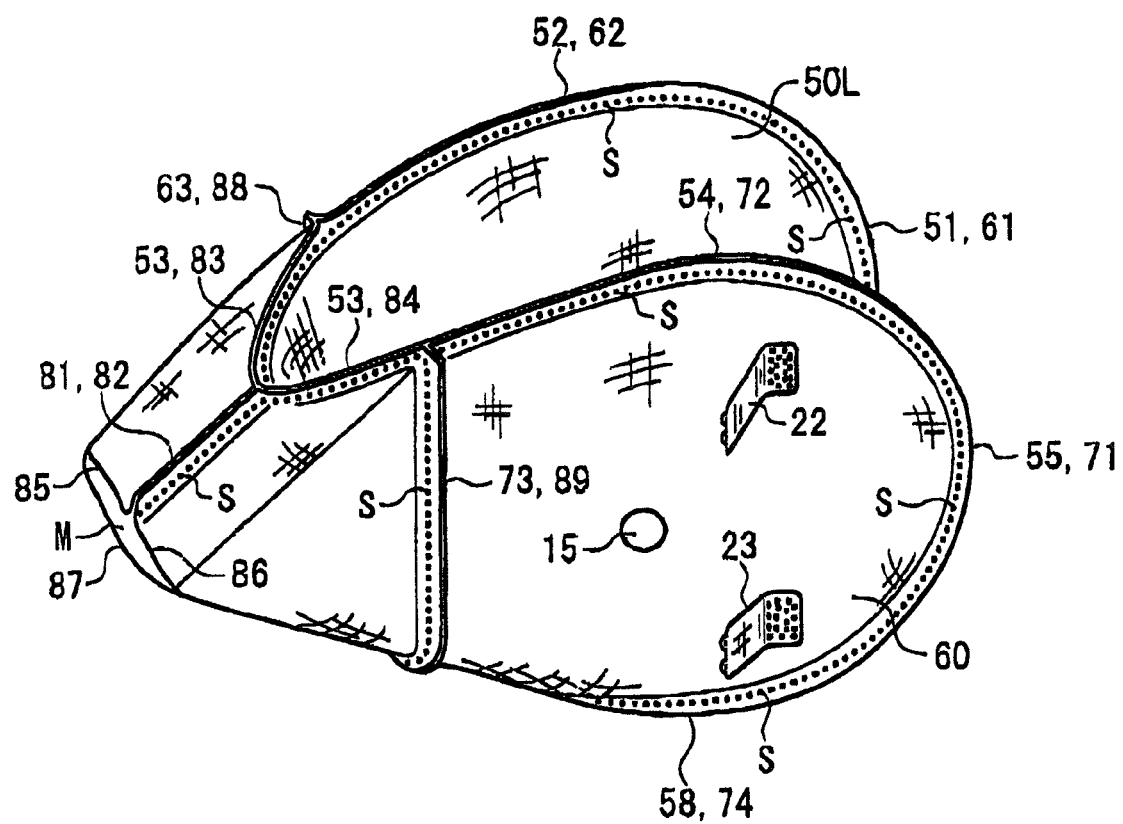
FIG. 4 is an exploded perspective view in the course of sewing of the airbag in FIG. 1.
Figure 6B:
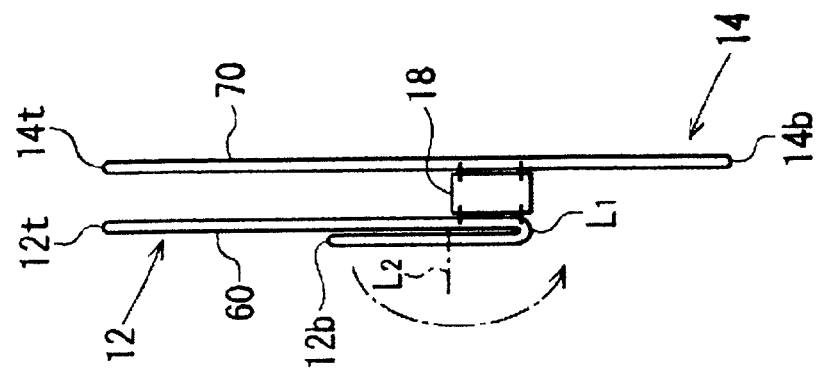
FIGS. 6(*a*) and 6(*b*) are explanatory views showing the process of folding the airbag in FIG. 1.
Figure 6A:
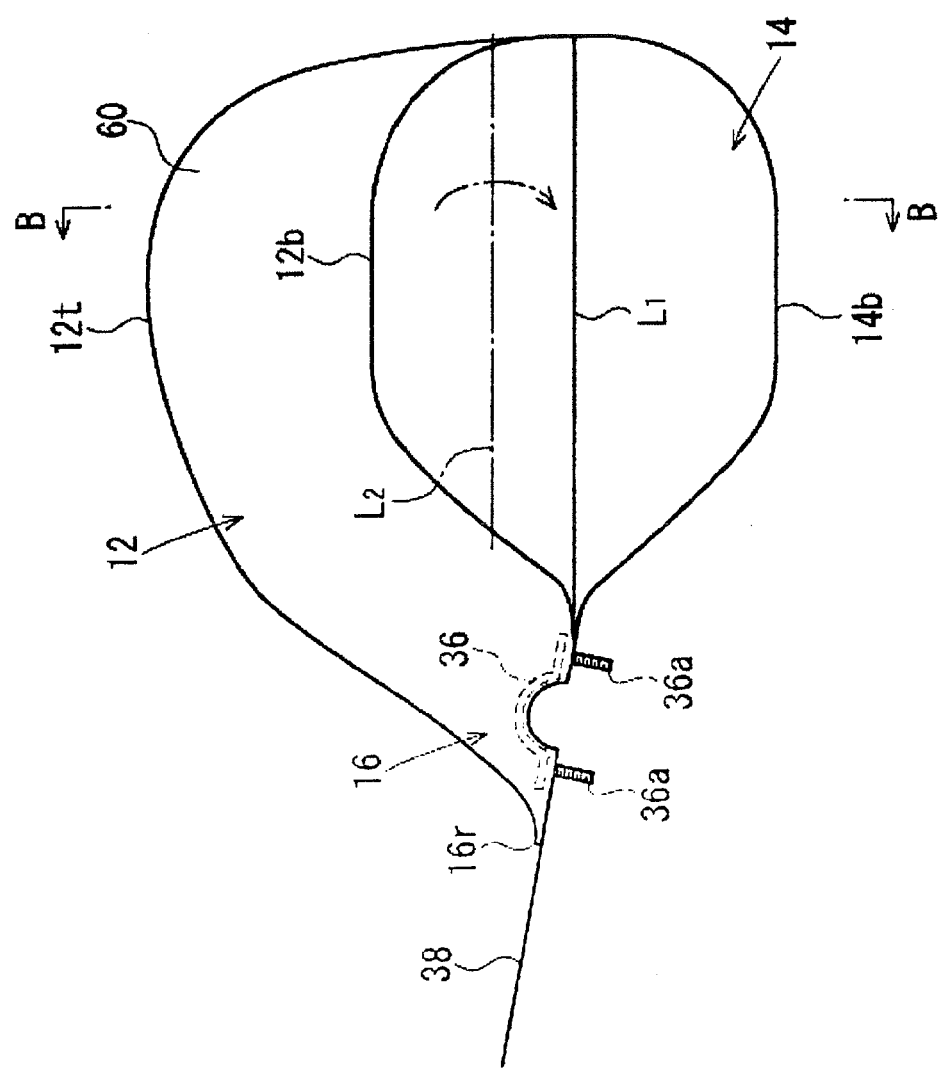
Figure 22A:
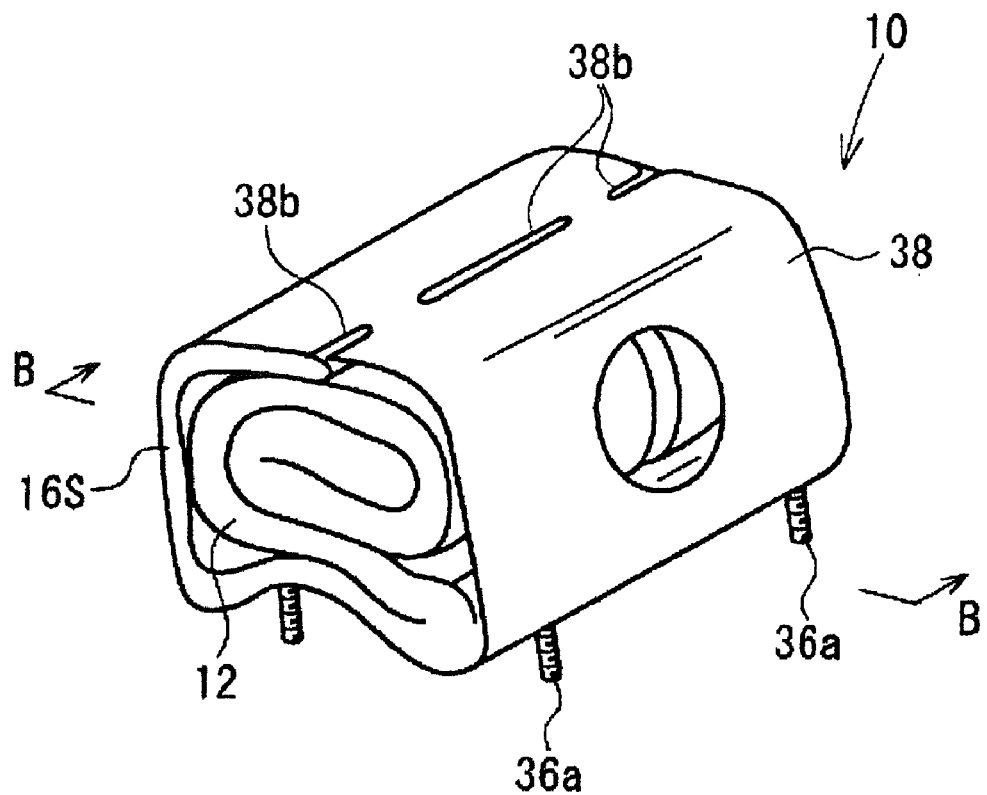
FIGS. 22(a) and 22(b) are explanatory views showing the process of folding the airbag in FIG. 1.
Figure 22B:
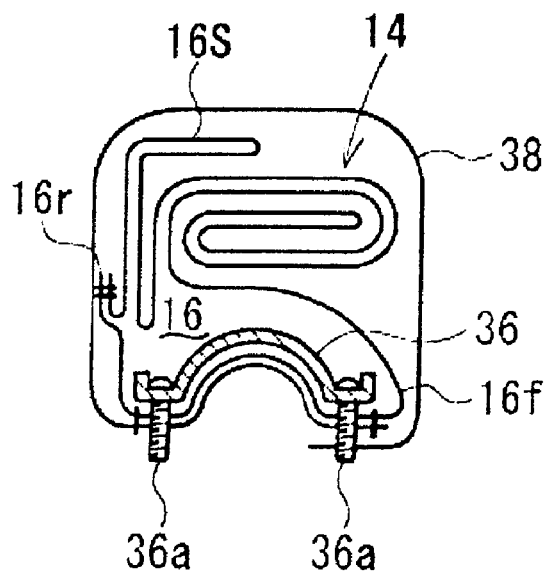
Figure 23:
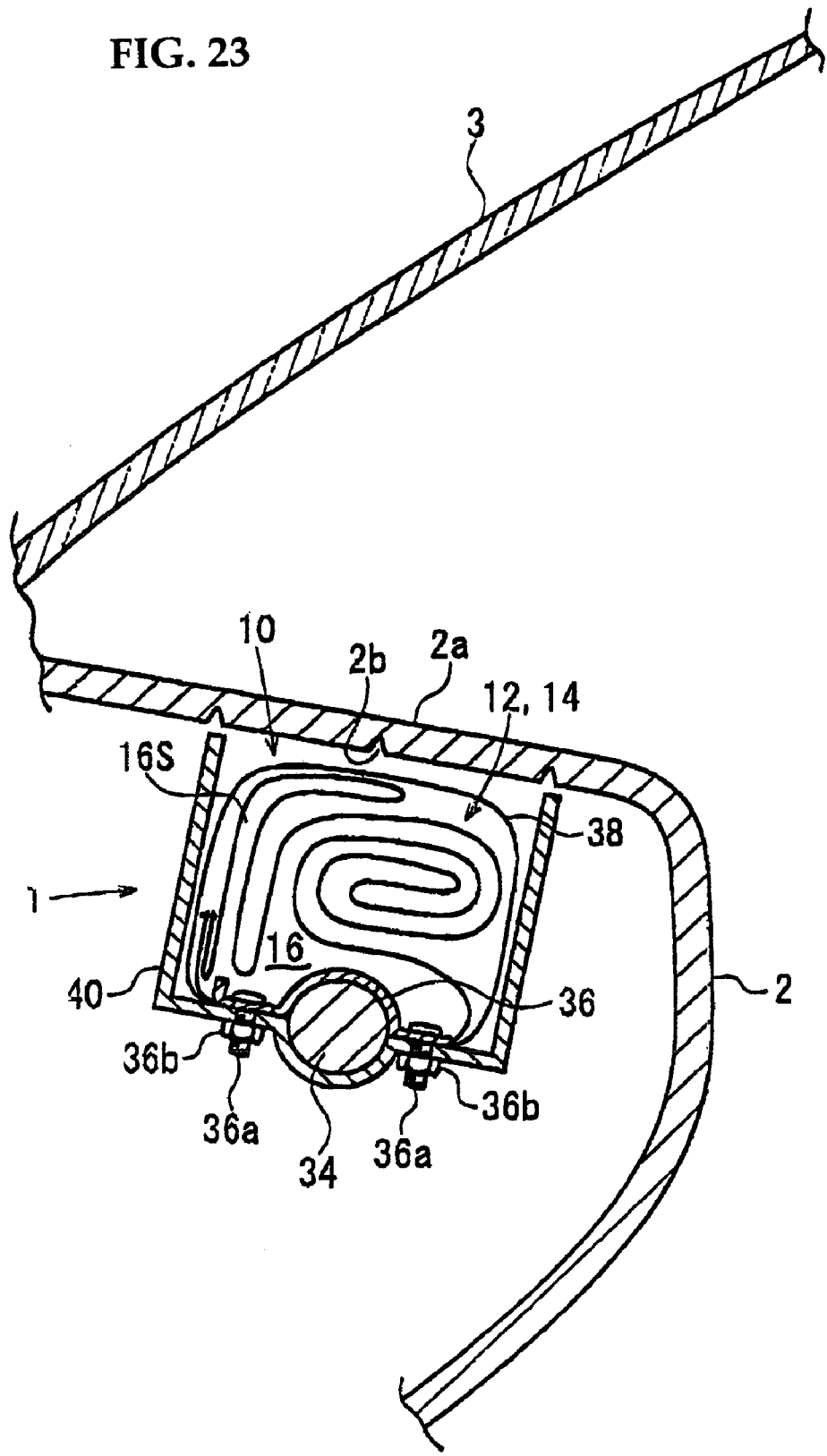
FIG. 23 is a longitudinal sectional view of an airbag device including the folded airbag in FIG. 1.
Figure 24:
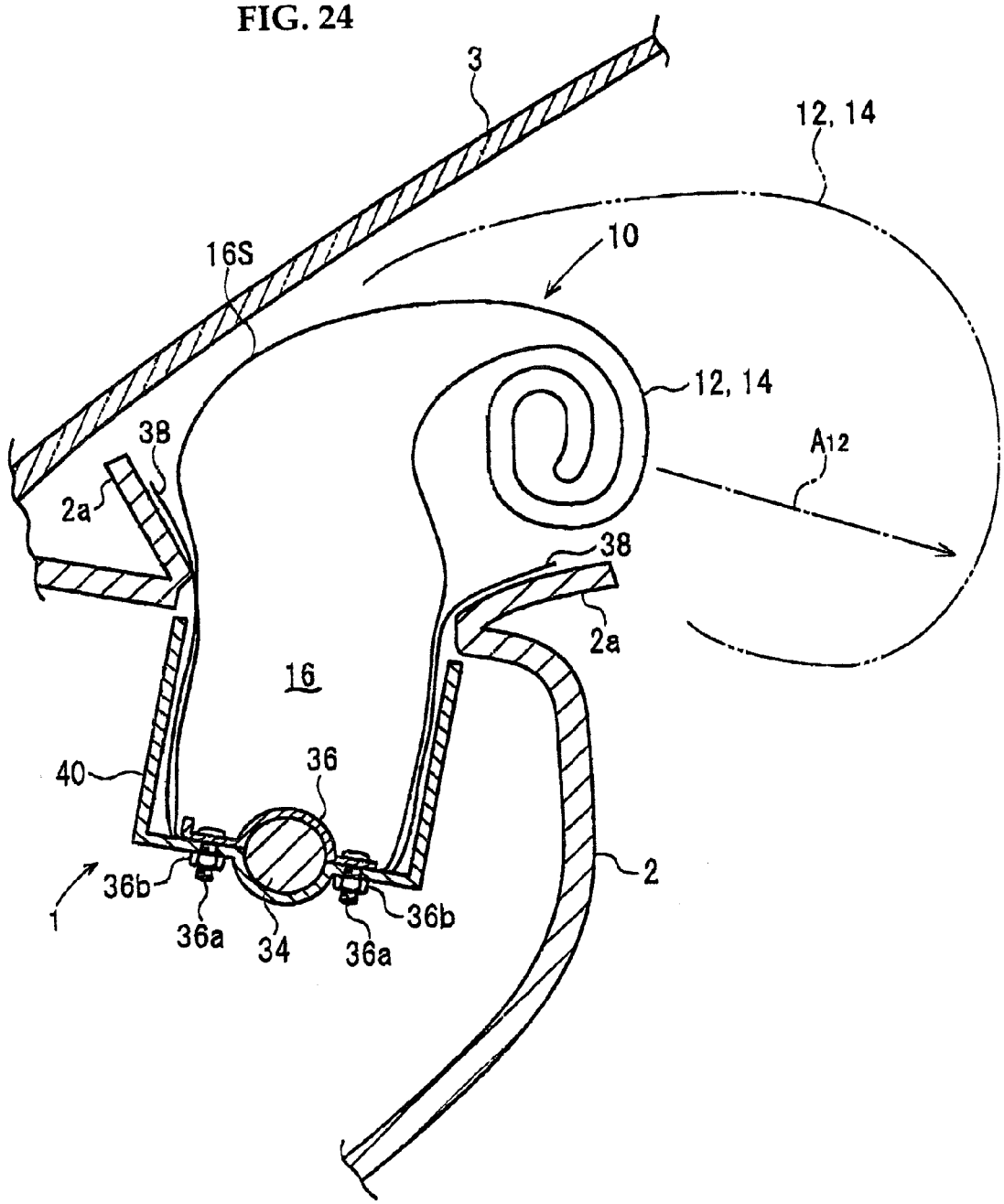
FIG. 24 is a longitudinal sectional view of the airbag device in FIG. 23 when the airbag is inflated.

FIG. 1 is a perspective view of an airbag according to an embodiment of the invention. FIG. 2 is a horizontal sectional view of the airbag. FIG. 3 is an exploded perspective view showing the structure of panels of the airbag. FIG. 4 is an exploded perspective view in the course of sewing of the airbag. FIGS. 5(a) to 22(b) are explanatory views showing the process of folding the airbag. FIG. 23 is a longitudinal sectional view of an airbag device including the folded airbag. FIG. 24 is a longitudinal sectional view showing the airbag device when the airbag is being inflated.

An airbag 10 includes a left airbag section 12 that is inflated on the front left side of a passenger, a right airbag section 14 that is inflated on the front right side of the passenger, and a base chamber 16 that communicates one end of the left airbag section 12 with one end of the right airbag section 14. The base chamber 16 is the base side of the airbag 10. Accordingly, the left airbag section 12 and the right airbag section 14 are respectively inflated in a direction away from the base chamber 16. In addition, hereinafter, the left airbag section 12 and the right airbag section 14 may simply be referred to as bags 12 and 14, respectively. The outer faces of the left and right bags 12 and 14 are provided with vent holes 15, respectively.

When the airbag 10 is inflated, a space 13 (shown in FIG. 2) is formed between a front most end of the left airbag section 12 and a front most end of the right airbag section 14 without a bridging member such as a tie panel therebetween. The space 13 is opened toward the passenger (toward the upper side in FIG. 2).

When the airbag 10 is completely inflated, it is preferable that the distance between the front most end of the left airbag section 12 and the front most end of the right airbag section 14 be 150 to 450 mm, particularly, 170 to 430 mm.

It is also preferable that the horizontal distance from one of the front most ends to a deepest portion of a space 13 be 280 to 480 mm, particularly, 310 to 450 mm. In a middle portion between the front most end and the deepest portion, the bags 12 and 14 are connected to each other by a connecting band 18. In this embodiment, the connecting band 18 is fixed to the bags 12 and 14 so that the width direction becomes an up-and-down direction when the airbag 10 is inflated.

In this embodiment, the connecting band 18 comprises a left half of connecting band 18L and a right half of connecting band 18R.

Width-regulating tethers 20L and 20R, which regulate the width of the bags in the right-and-left direction at the time of inflation, are provided in the bags 12 and 14, respectively. Each of the width-regulating tethers 20L and 20R includes an inclined tether portion 20a and a cross tether portion 20b, which extend in an inclined direction and in a cross direction (substantially horizontal direction) in a longitudinal section taken along a direction intersecting the forward and rearward direction of the bags 12 and 14 in the inflation state of the bags.

Furthermore, the inclined tether portion 20a of the width-regulating tether 20L of the left airbag section 12 connects the upper portion of the part of the bag 12 opposite to the bag 14 (a left outside panel 60 to be described below) with the lower portion of the part of the bag 12 facing the bag 14 (a left side 50L of an inside panel 50 to be described below). In addition, the lower portion of the part of the bag 12 opposite to the bag 14, and the lower portion of the part of the bag 12 facing the bag 14 (the left outside panel 60 and the left side 50L) are connected to each other by the cross tether portion 20b of the width-regulating tether 20L.

In addition, the inclined tether portion 20a of the width-regulating tether 20R of the right airbag section 14 connects the upper portion of the part of the bag 14 opposite to the bag 12 (a right outside panel 70 to be described below) with the lower portion of the part of the bag 14 facing the bag 12 (a right side 50R of an inside panel 50 to be described below). In addition, the lower portion of the part of the bag 14 opposite to the bag 12, and the lower portion of the part of the bag 14 facing the bag 12 (the outside panel 70 and the right side 50R) are connected to each other by the cross tether portion 20b of the width-regulating tether 20R.

In this embodiment, each of the cross tether portions 20b is disposed at the same height as that of the connecting band 18. Furthermore, when the airbag 10 is inflated, the cross tether portions 20b of the tethers 20L and 20R and the connecting band 18 extend in the substantially horizontal direction and in the shape of a substantial straight line.

The panel structure, etc. of the airbag 10 will be described below. In addition, in the following description, the front side (leading side) of each panel means the leading side of the airbag 10 in the inflation direction and the rear side means the base side of the airbag in the inflation direction.

The airbag 10 comprises a total of four panels, i.e., an inside panel 50, a left outside panel 60, a right outside panel 70, and a base panel 80. Each of the left and right halves of connecting band 18L and 18R is connected to the side panel 50.

The inside panel 50 is a substantially gourd-shape, elongated panel. A left side 50L and a right side 50R are formed by folding the inside panel into two in the middle of the inside panel. In the inside panel 50, the left side 50L constitutes the inner face of the left airbag section 12, and the right side 50R constitutes the inner face of the right airbag section 14. The entire peripheral edge of the side panel 50 comprises a lower edge 56, a leading edge 51 and an upper edge 52 of the left side 50L, an upper edge 53 which lies in the vicinity of a folded-back portion constituting the deepest portion between valleys of the airbag, an upper edge 54, a leading edge 55 and a lower edge 58 of the right side 50R, and a lower edge 57 which lies in the vicinity of the folded-back portion.

The entire peripheral edge of the left outside panel 60 comprises a leading edge 61, an upper edge 62, a straight rear edge 63, and a lower edge 64 (here, reference numeral 64 is not shown). The entire peripheral edge of the right outside panel 70 comprises a front edge 71, an upper edge 72, a straight rear edge 73, and a lower edge 74. The outside panels 60 and 70 are provided with vent holes 15, respectively. A reinforcing patch cloth (not shown) is provided at the periphery of each vent hole 15.

The base panel 80 has a left lateral face 80A, a bottom face 80B, a right lateral face 80C, a left flap 80D constituting a top left side and a right flap 80E constituting a top right side. The base panel 80 is folded in such a manner that the lateral faces 80A and 80C form a substantially triangular shape, respectively. The face of the base panel 80 that faces the leading side of the airbag 10 is also opened.

The entire peripheral edge of the base panel 80 comprises facing edges 81 and 82 between substantially rectangular flaps 80D and 80E, front edges 83 and 84 (flap front edges) of the flaps 80D and 80E, rear edges 85 and 86 of the flaps 80D and 80E, a rear edge 87 facing the rear edges 85 and 86, front edges 88 and 89 (lateral front edges) of the lateral faces 80A and 80C, and a bottom front edge 80f that connects the lateral front edges 88 and 89 with each other.

In addition, as shown in FIG. 2, the bottom face 80B of the base panel 80 is provided with a gas introducing port 90. A frame-like reinforcing cloth 91 is overlapped and sewn to the gas introducing port 90 so as to surround it. The gas introducing port 90 is rectangular, and has bolt insertion holes 92 formed in the vicinity of the four corners.

In this embodiment, each of the width-regulating tethers 20L and 20R comprises three tether halves (panels) 21, 22, and 23 (shown in FIG. 2). Each of the tether halves 21 is a panel that is divided into two branches so as to form a substantial V shape. One of the two branches constitutes the part of the inclined tether portion 20a on the inside panel 50 side, and the other thereof constitutes the part of the cross tether portion 20b on the inside panel 50 side. A junction (base portion) of the two branches of each V-shaped tether half 21 is sewn on the inner face of the inside panel 50.

In this embodiment, the junctions of the tether halves 21 are disposed in the bags 12 and 14, respectively, with the inside panel 50 therebetween so as to overlap with one end of the left or right half of connecting band 18L or 18R. Accordingly, each of the tether halves 21 serves as a reinforcing cloth for reinforcing the suture between the left or the right half of connecting band 18L or 18R and inside panel 50. In addition, the left or right half of connecting band 18L or 18R serves as a reinforcing cloth for reinforcing the suture between inside panel 50 and each tether half 21.

The remaining tether halves 22 and 23 constitute the parts of the inclined tether portion 20a and the cross tether portion 20b, which face the outside panels 60 and 70, respectively. One ends of the tether halves 22 are sewn on the inner faces of the upper portions of the outside panels 60 and 70, respectively, and one ends of the tether halves 23 are sewn on the inner faces of the lower portions of the outside panels 60 and 70, respectively. Reference numeral 24 represents reinforcing cloths that are disposed at the opposite ends to the one end of the tether halves 22 and 23 with the outside panels 60 and 70 therebetween, respectively, and are sewn together with the opposite ends and the outside panels 60 and 70.

The other ends of the tether halves 22 and 23 are attached to both ends of the two branches of the tether halves 21, respectively.

In making the airbag 10, first, the rear edge 63 of the left outside panel 60 and the rear edge 73 of the right outside edge 70 are sewn to the lateral front edges 88 and 89, respectively, in a state where the base panel 80 is spread flatly. Next, the facing edges 81 and 82 of the flaps 80D and 80E of the base panel 80 are sewn together.

Next, the left outside panel 60 is caused to face the left side 50L of the inside panel 50 in a flattened state, and the leading edges 51 and 61, the upper edges 52 and 62 and the lower edges 56 and 64 are sewn together, respectively. The right outside panel 70 is caused to face the right side 50R of the inside panel 50, and the leading edges 55 and 71, the upper edges 54 and 72 and the lower edges 58 and 74 are sewn together, respectively. Also, the flap front edges 83 and 84 of the base panel 80 are sewn to the upper edge 53 in the vicinity of the folded-back portion of the inside panel 50, and the bottom front edge 80f of the base panel 80 is sewn to the lower edge 57 in the vicinity of the folded-back portion.

Next, both ends of the two branches of the tether half 21 attached to the left side 50L of the inside panel 50 are sewn to the other ends of the tether halves 22 and 23 attached to the upper and lower portions of the left outside panel 60, respectively. In addition, both ends of the two branches of the tether half 21 attached to the right side 50R of the inside panel 50 are sewn to the other ends of the tether halves 22 and 23 attached to the upper and lower portions of the right outside panel 70, respectively.

By sewing the tether halves 21 to 23 together, the left side 50L and the left outside panel 60 are connected to each other by the tether 20L. Furthermore, the right side 50R and the right outside panel 70 are connected to each other by the tether 20R.

As shown in FIG. 4, this sewing turns the airbag 10 (FIG. 1) inside out, that is, exposing a sewing thread to the surface of the airbag. As shown in FIG. 4, the flap rear edges 85 and 86 and the rear edge 87 of the base panel 80 are not yet sewn together, but they form an opening M in this state.

Consequently, the airbag is inverted through the opening M. Next, the opening M is sewn and the left and the right halves of connecting band 18L and 18R are sewn together, resulting in the airbag 10 in FIG. 1.

In this embodiment, an inflator 34 (see FIGS. 23 and 24) is disposed within the base chamber 16 through the gas introducing port 90 at the bottom of the base chamber 16. In this embodiment, the inflator 34 is rod-shaped, and disposed such that the longitudinal direction is the width direction (the right-and-left direction) of a vehicle. Reference numeral 36 represents a fixing plate as a fixture to fix the bottom face of the base chamber 16 and the inflator 34 to an airbag mounting face of the accommodating case 40 (the bottom face of an accommodating case 40 in this embodiment) (see FIGS. 23 and 24).

The fixing plate 36 has a C-shaped land (reference numeral is omitted) fitted on lateral peripheral faces of the inflator 34 at the longitudinal opposite ends, flanges (reference numeral is omitted) that extend along the bottom face of the base chamber 16 (and the airbag mounting face of the case 40) from both lateral ends of the C-shaped land, and stud bolts 36a protruding downwardly from the flanges, respectively. In addition, each flange is provided with a pawl (reference numeral is omitted) to lock the fixing plate 36 to a peripheral edge of the gas introducing port 90, and the peripheral edge of the gas introducing port 90 is provided with a locking hole (reference numeral is omitted) for the pawl.

Prior to folding of the airbag 10 that has been completely sewn, the fixing plate 36 is introduced into the base chamber 16 from the gas introducing port 90, and attached to the peripheral edge of the gas introducing port 90. At this time, the flanges of the fixing plate 36 overlap peripheral edge of the gas introducing port 90 while the stud bolts 36a are inserted into the insertion holes 92, respectively, and the pawl of the flanges are hooked to the locking holes, respectively, thereby fixing the fixing plate 36. The stud bolts 36a extend to the outside of the airbag 10 through the insertion holes 92.

By fastening the fixing plate 36 to the airbag mounting face of the case 40 with the stud bolts 36a, the bottom face of the base chamber 16 and the inflator 34 are fixed to the airbag mounting face. Reference numeral 36b in FIGS. 23 and 24 represent nuts screwed around the stud bolts 36a, respectively.

In this embodiment, a protector cloth 38 is connected to a rear end of the base chamber 16 to wrap a folded body of the airbag 10. In this embodiment, the protector cloth 38 is a band-like panel that extends rearwardly from the rear end of the base chamber 16. A base end part of the protector cloth is sewn on the outer face of the airbag 10 at the peripheral edge of the gas introducing port 90.

In addition, the base end part of the protector cloth 38 is provided with an opening (not shown) overlapping the gas introducing port 90, and holes (not shown) overlapping the pawl locking holes and the insertion holes 92 for the stud bolts 36a, respectively. The inflator 34 is disposed within the inflator 16 through the opening of the protector cloth 38 and the gas introducing port 90. Also, the stud bolts 36a extend to the outside of the airbag 10 through the bottom face of the base chamber 16 and the protector cloth 38.

Insertion hole 38a for the stud bolts 36a are bored in a leading end of the protector cloth 38.

The protector cloth 38 is adapted to be ruptured when it receives a predetermined tension or more in the extending direction suffered. Specifically, perforated slits 38b are formed in an extending middle portion of the protector cloth 38 so as to extend in a direction intersecting the extending direction of the cloth 38. When the protector cloth 38 receives a predetermined tension or more, it is torn and ruptured along the slits 38b.

The airbag 10 is folded and accommodated within the case 40, along with the inflator 34, and the accommodated airbag 10 is fixed to the airbag mounting face with the nuts 36b and the bolts 36a of the fixing plate 36, thereby forming an airbag device 1.

In addition, in this embodiment, the airbag device 1 is for a passenger seat of a vehicle, which is installed on the back of an instrument panel 2 in front of the front passenger seat. A portion of the instrument panel 2 that covers the case 40 servers as a door 2a that is pushed and torn open toward the interior of the vehicle by the airbag 10 when the airbag 10 is inflated. Reference numeral 2b in FIG. 23 represents a tear line that induces the tearing of the door 2a.

It should be noted herein that a structure may be employed in which the case 40 is mounted with a lid adapted to be pushed and torn open by the airbag 10 when the airbag 10 is inflated and the instrument panel 2 is provided with an opening for installation of the airbag device 1 so that the airbag device 1 is covered with the lid in installing the airbag device 1 into the opening.

As shown in FIG. 23, a windshield 3 exists above the instrument panel 2. The windshield 3 inclines upward and rearward from an end of the instrument panel 2 on the front side of the vehicle.

Next, the process of folding the airbag 10 will be described with reference to FIGS. 5(a) to 22(b). FIGS. 5(a) and 5(b) show a state before the airbag 10 is folded. FIGS. 6(a) to 21 show a state in the course of folding of the airbag. FIGS. 22(a) and 22(b) show a state in which the airbag 10 is completely folded.

Figure 11:
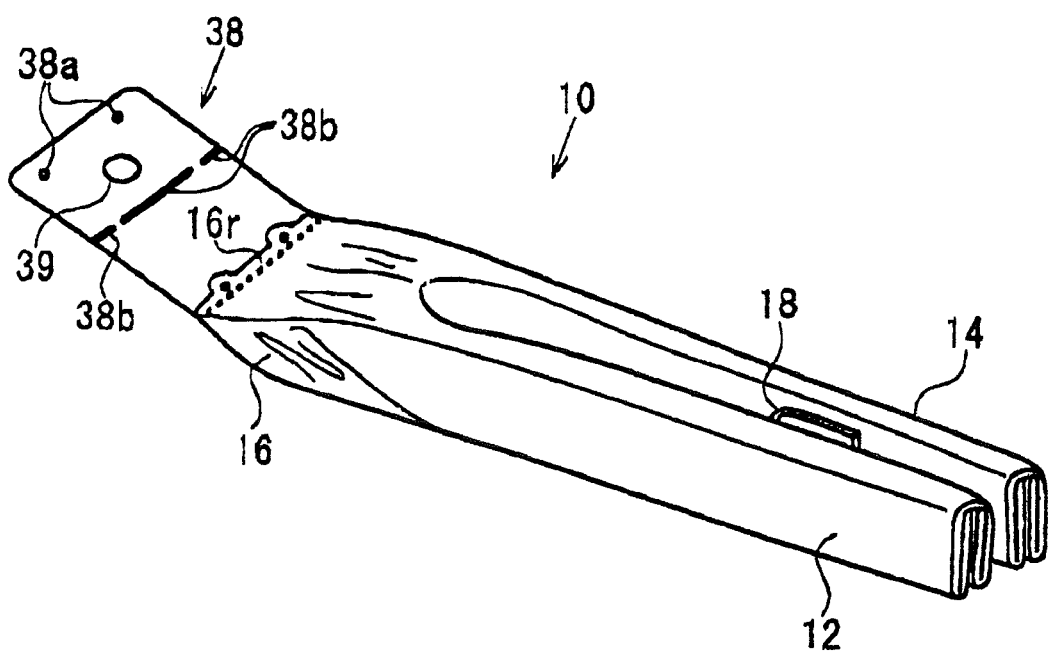
FIG. 11 is an explanatory view showing the process of folding the airbag in FIG. 1.
Figure 12C:
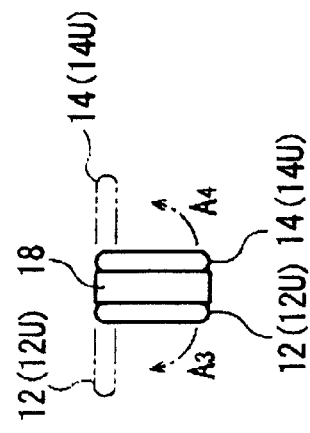
FIGS. 12(a), 12(b), and 12(c) are explanatory views showing the process of folding the airbag in FIG. 1.
Figure 12A:
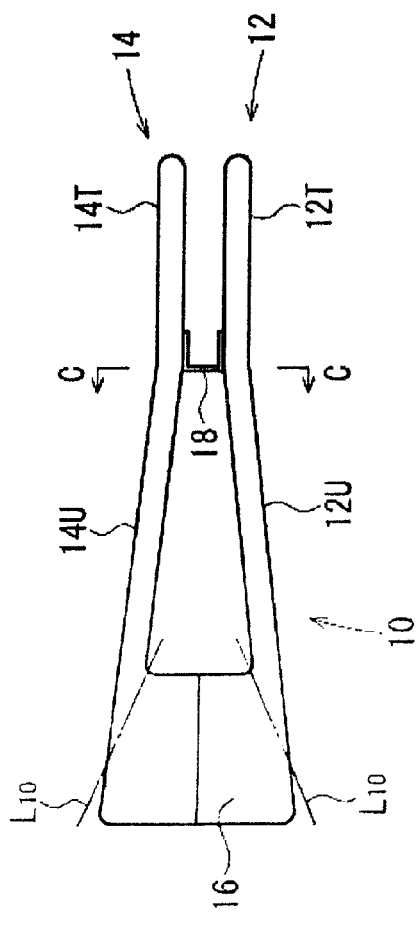
Figure 12B:
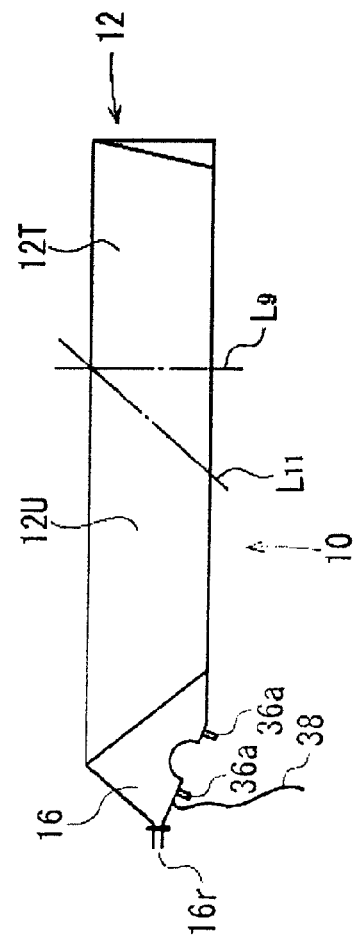
Figure 13A:
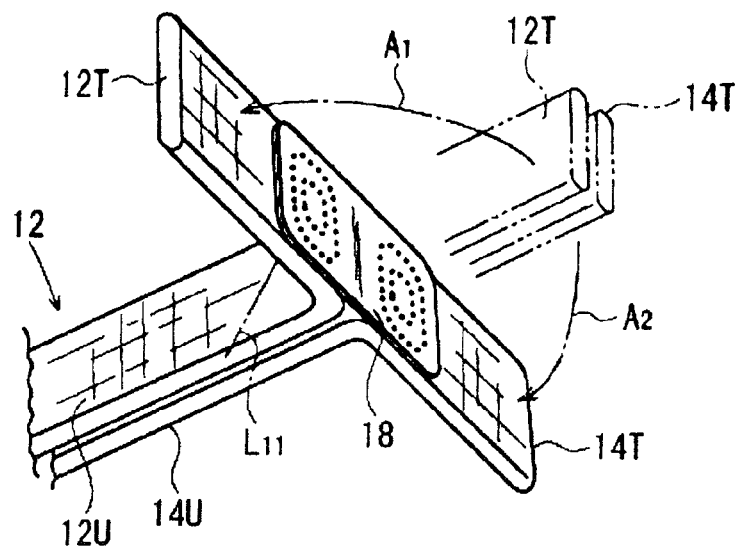
FIGS. 13(a), 13(b), and 13(c) are explanatory views showing the process of folding the airbag in FIG. 1.
Figure 13B:
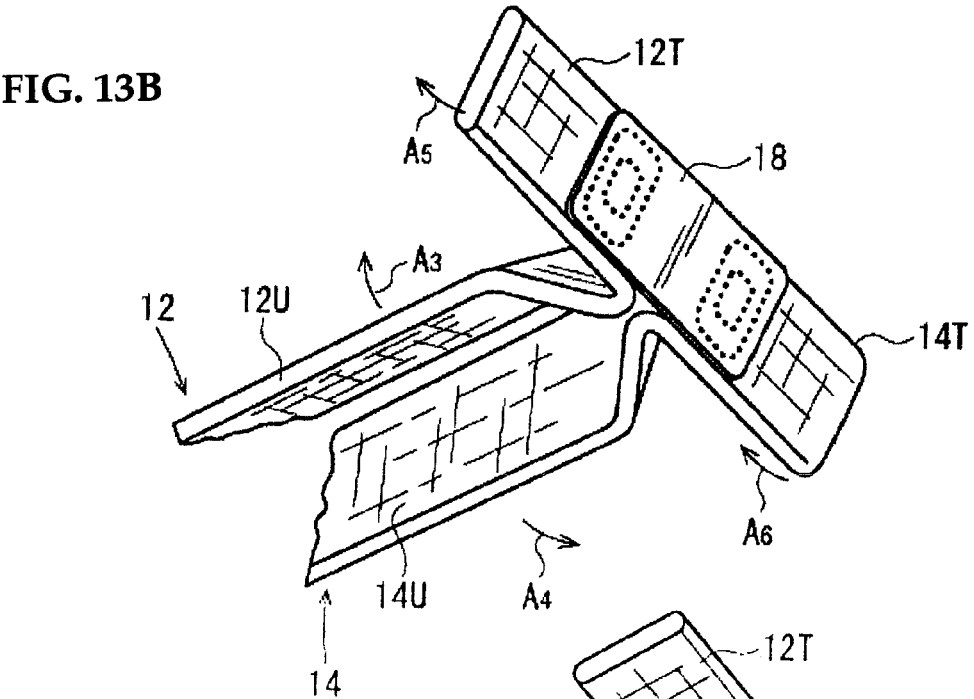
Figure 13C:
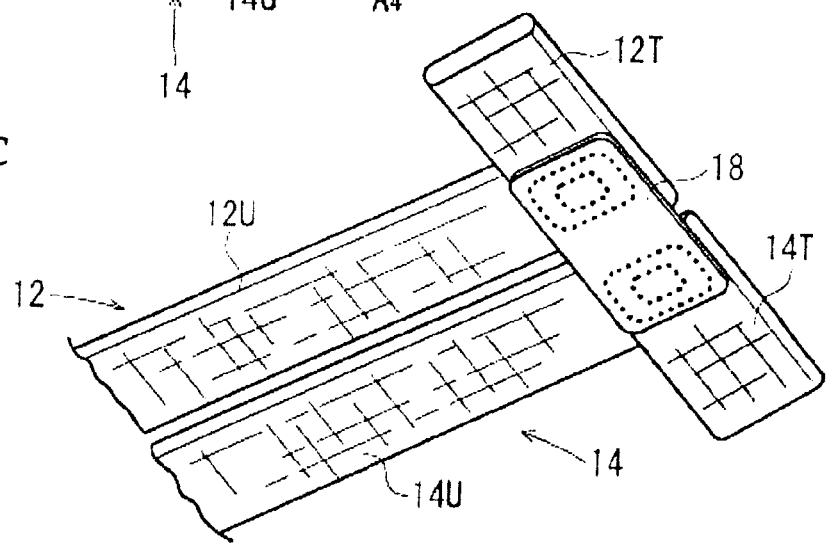
Figure 14:
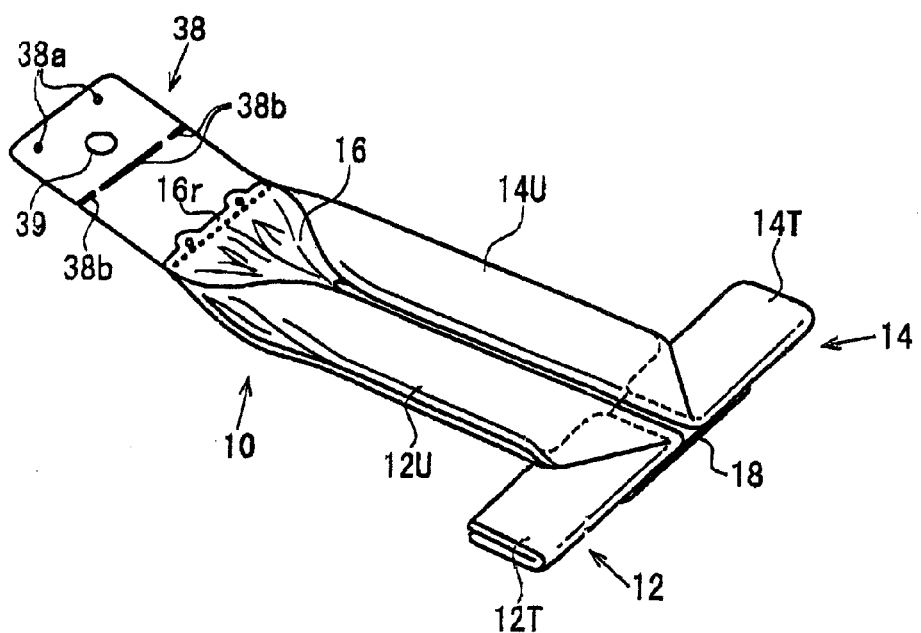
FIG. 14 is an explanatory view showing the process of folding the airbag in FIG. 1.
Figure 15A:
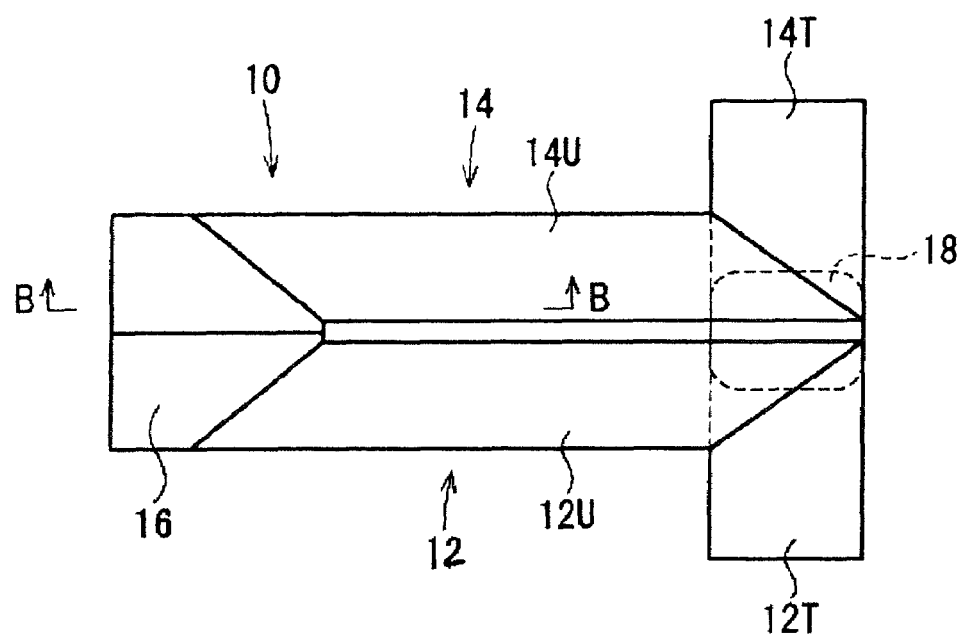
FIGS. 15(a) and 15(b) are explanatory views showing the process of folding the airbag in FIG. 1.
Figure 15B:
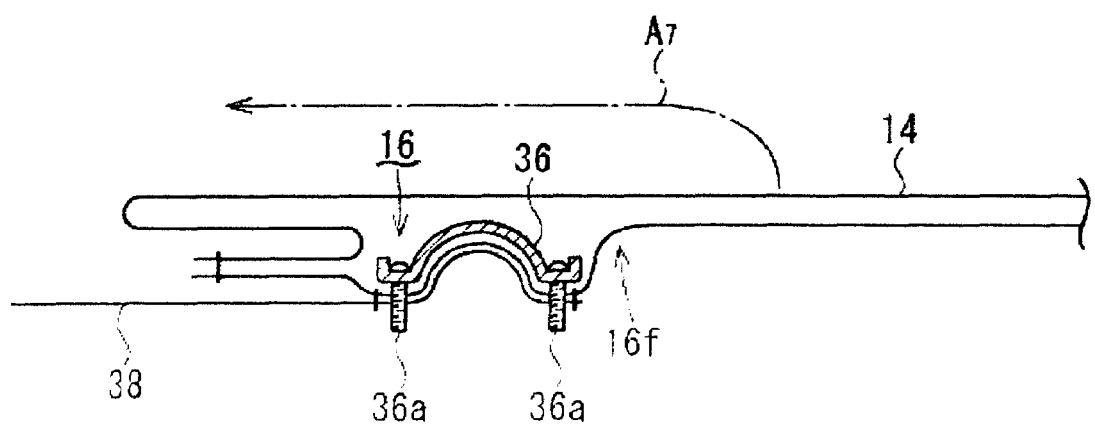
Figure 16:
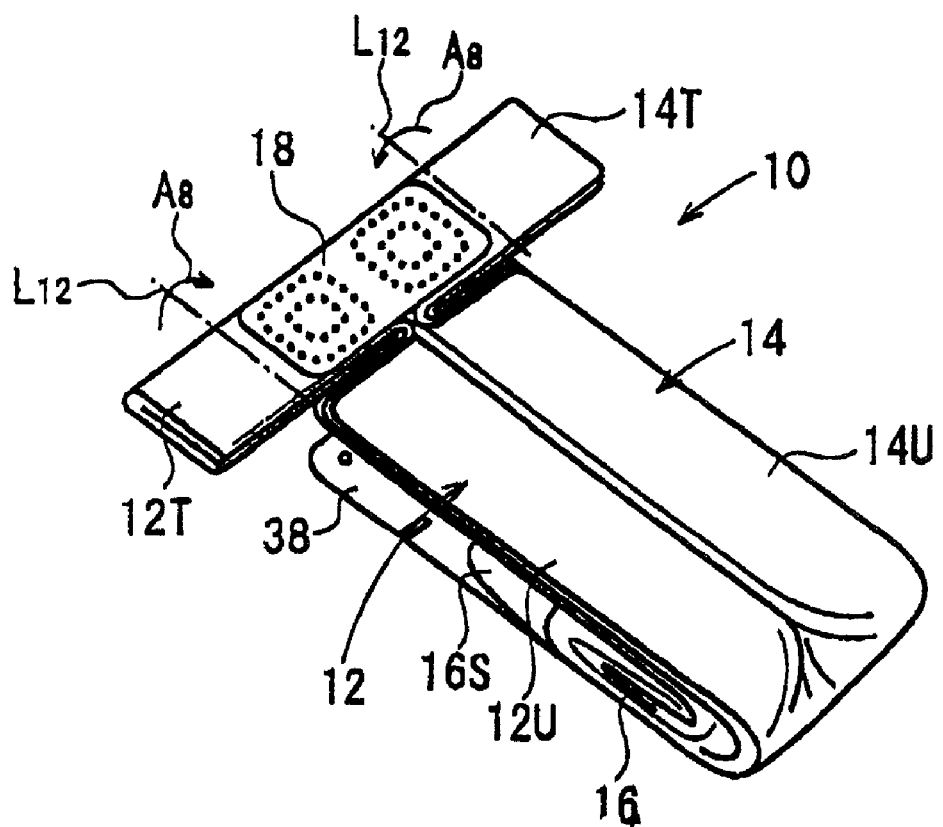
FIG. 16 is an explanatory view showing the process of folding the airbag in FIG. 1.
Figure 17A:
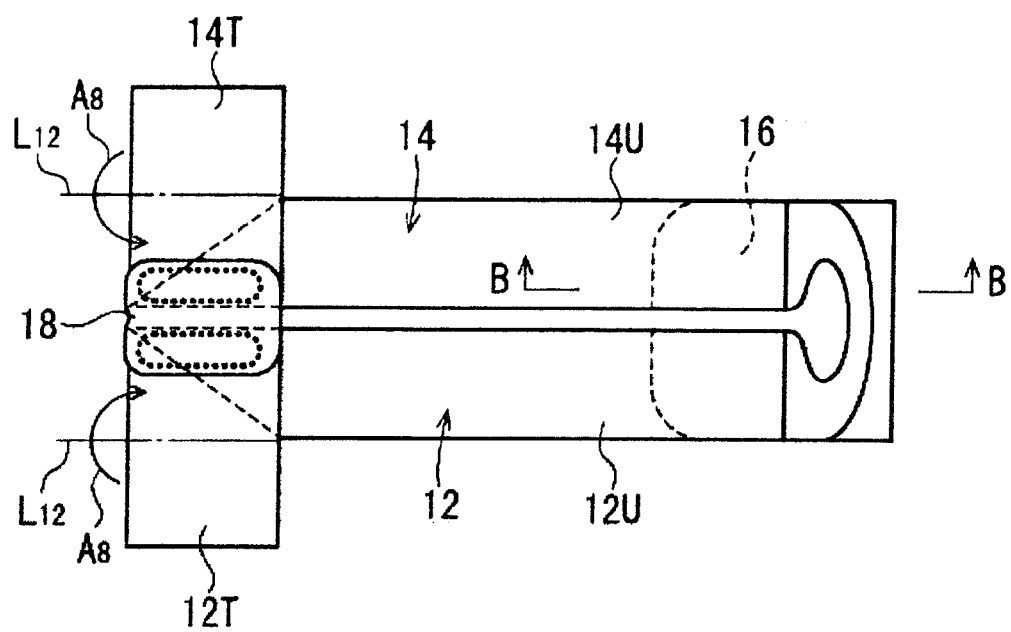
FIGS. 17(a) and 17(b) are explanatory views showing the process of folding the airbag in FIG. 1.
Figure 17B:
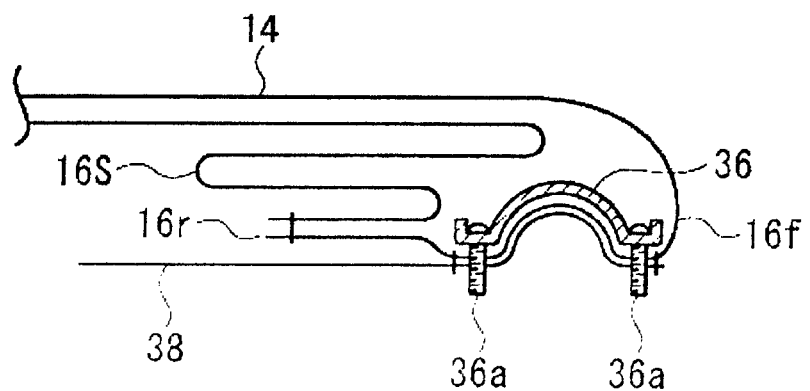

Furthermore, in FIGS. 5(a) to 10(b), FIGS. 5(a), 6(a), 7(a), 8(a), 9(a) and 10(a) are side views of the airbag, and FIGS. 5(b), 6(b), 7(b), 8(b), 9(b) and 10(b) are sectional views taken along the lines B-B in FIGS. 5(a), 6(a), 7(a), 8(a), 9(a) and 10(a). FIGS. 11, 14, 16, 18, 20, and 22(a) are perspective views of the entire airbag, and FIGS. 13(a) to 13(c) are perspective views of the leading side of the airbag showing a process in which the a state of the airbag is changed from a state in FIG. 11 to a state in FIG. 14. FIG. 12(a) is a top view showing the airbag in a state shown in FIG. 11, and FIG. 12(b) is a side view showing the airbag in a state shown in FIG. 11. FIG. 12(c) is a sectional view taken along the line C-C in FIG. 12(a). FIG. 15(a) is a top view showing the airbag in a state shown in FIG. 14, and FIG. 15(b) is a sectional view taken along the line B-B in FIG. 15(a). FIG. 17(a) is a top view showing the airbag in a state shown in FIG. 16, and FIG. 17(b) is a sectional view taken along the line B-B in FIG. 17(a). FIGS. 19(a) to 19(c) show a process in which the a state of the airbag is changed from a state in FIG. 18 to a state in FIG. 20, and are sectional views taken along the line XIX-XIX in FIG. 18. FIG. 21 shows a process in which the state of the airbag is changed from a state in FIG. 20 to a state in FIG. 22(a), and is a sectional view taken along the line XXI-XXI in FIG. 20. FIG. 22(b) is a sectional view taken along the line B-B in FIG. 22(a).

In folding the airbag 10, first, the left airbag section 12 and the right airbag section 14 are spread flatly such that their respective left and right lateral faces (the left side 50L and the left outside panel 60 or the right side 50R and the right outside panel 70) overlap each other. Then, as shown in FIGS. 5(a) to 12(c), the left airbag section 12 and the right airbag section 14 are respectively folded so as to have a reduced vertical width, resulting in primary folded bodies that are elongated in forward and rearward directions.

In the primary folded bodies, in this embodiment, first as shown in FIGS. 5(a), 5(b), 6(a) and 6(b), a portion of the left airbag section 12 (lower airbag section) that is lower than the connecting band 18 (the connecting band between the left airbag section 12 and the right airbag section 14) is folded back upwardly along a folding line $L_1$ that connects a lower edge of the connecting band 18 and a lower edge of the fixing plate 36 at the front end, and is overlapped with the left outside panel 60.

Next, as shown in FIGS. 6(a), 6(b), 7(a), and 7(b), a portion closer to the lower edge 12b than the folding line $L_2$ is folded back downwardly along a folding line $L_2$ that extends parallel to the folding line $L_1$ with a predetermined spacing toward a lower edge 12b (upper side) from the folding line $L_1$ and is overlapped with the outside (the side opposite to the right airbag section 14). At this time, the position of the folding line $L_2$ is determined, for example, by attaching a ruler or a predetermined width of a plate, etc. along the folding line $L_1$. Similar to this, the following folding lines $L_3$ to $L_7$ are also determined by attaching a ruler or a predetermined width of a plate, etc. along a previous folding line.

Next, as shown in FIGS. 7(a), 7(b), 8(a), and 8(b), the portion that protrudes downwardly from the folding line $L_1$, due to the second folding is upwardly folded back. At this time, a portion closer to the lower edge 12b than the folding line $L_3$ is folded back upwardly along a folding line $L_3$ that extends parallel to the folding line $L_2$ with a predetermined spacing (in this embodiment, the spacing that is narrower than the spacing between the folding line $L_2$ and the folding line $L_1$) toward the lower edge 12b (lower side) from the folding line $L_2$ and is overlapped with the outside.

Figure 8B:
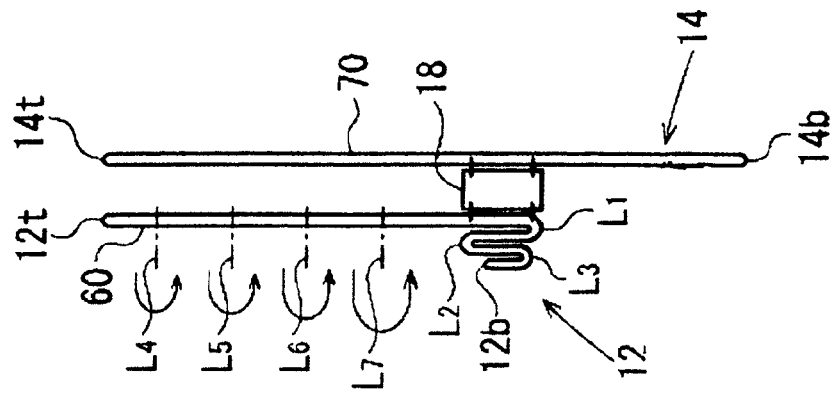
FIGS. 8(*a*) and 8(*b*) are explanatory views showing the process of folding the airbag in FIG. 1.
Figure 8A:
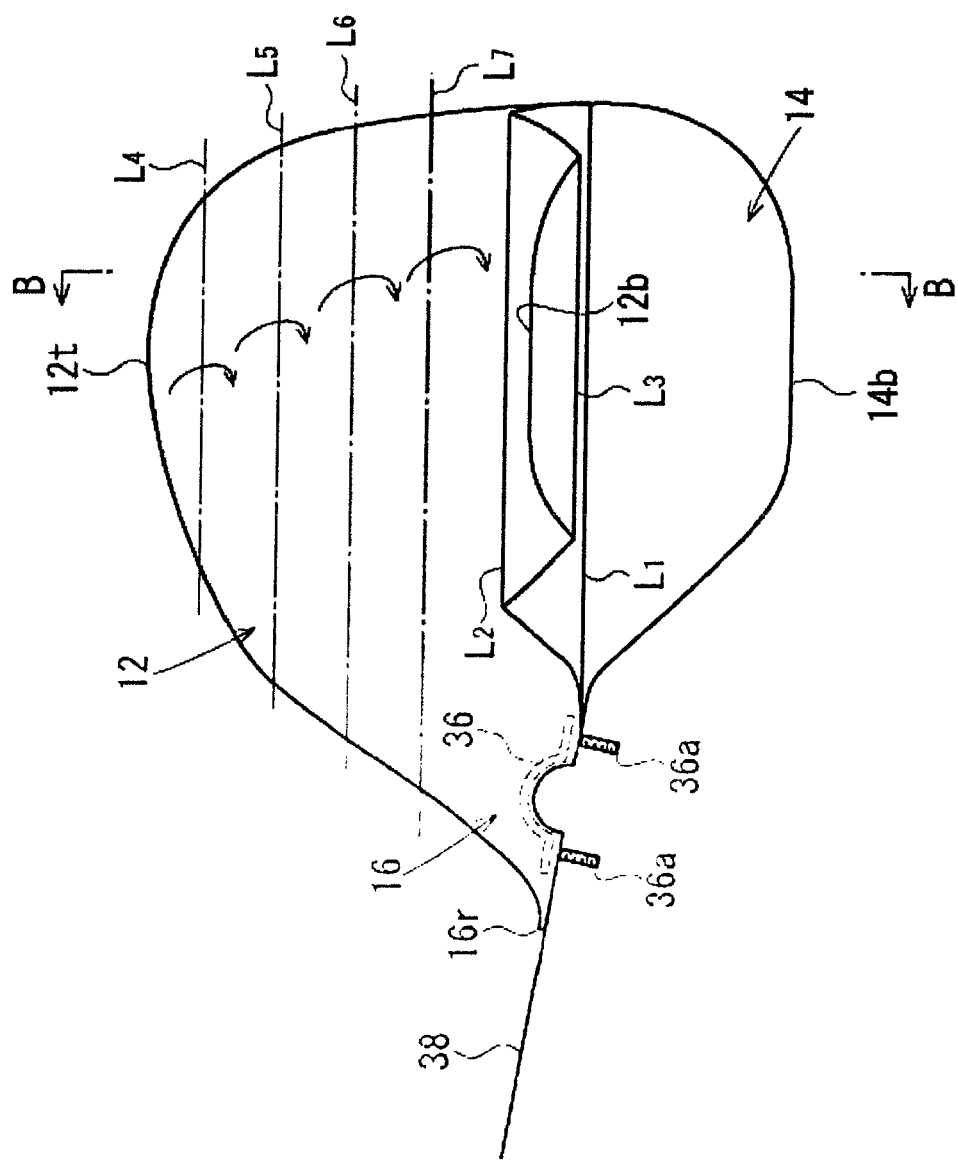

Next, as shown in FIGS. 8(a) to 9(b), a portion of the left airbag section 12 (an upper airbag section) closer to an upper edge 12t than the connecting band 18 is folded back toward the left outside panel 60 sequentially along folding lines $L_4$, $L_5$, . . . , that extend parallel to the folding line $L_1$, by a predetermined width downwardly from the upper edge 12t, resulting in an elongated folded roll. (Only folding lines up to $L_7$ are shown in FIGS. 8(a) and 8(b).) In this embodiment, the spacing of the folding lines $L_4$ to $L_7$ is set such that the vertical width becomes approximately equal to the vertical width of the lower folded body when the upper folded roll reaches a portion near an upper portion of the lower folded body as shown in FIGS. 9(a) and 9(b).

Thereafter, as shown in FIGS. 9(a), 9(b), 10(a), and 10(b), the upper folded roll is folded back downwardly along a line $L_8$, that is located between the folded roll and the lower folded body and extends parallel to the line $L_1$, and the upper folded roll is overlapped with the outside of the lower folded body. Accordingly, the strip face of the left airbag section 12 faces in the up-and-down direction, and the left bag 12 forms strip-shaped primary folded bodies extending in forward and rearward directions.

In addition, the roll folding may be performed, for example, by winding the upper airbag section around a predetermined width of a band-like plate from the upper edge 12t. In this case, if the upper airbag section is wound around a band-like plate and roll-folded, the resulting folded roll is overlapped with the outside of the lower folded body, and the band-like plate is then pulled out of the folded roll, the folding work of the upper airbag section can be efficiently performed.

The right airbag section 14 is also primarily folded through the process similar to the left airbag section 12 to form primary folded bodies. FIGS. 11, 12(a), 12(b), and 12(c) show the airbag in which the primary folding of the left airbag section 12 and the right airbag section 14 have been completed. In FIGS. 5(a) to 10(b), reference numerals 14b and 14t represent a lower edge and an upper edge, respectively, of the right airbag section 14.

The primary folding method of the left airbag section 12 and the right airbag section 14 is not limited to the above-mentioned folding method.

Furthermore, in FIGS. 10(b) and 11, the thickness of the primary folded bodies of the bag 12 in the right-and-left direction is shown larger than an actual thickness thereof. That is, the thickness of the primary folded bodies in the right-and-left direction is shown equal to the width of the primary folded bodies in the up-and-down direction, in order to clearly illustrate a state in which the bag 12 is folded by the primary folding. However, actually, the thickness of the primary folded bodies in the right-and-left direction is smaller than the width thereof in the up-and-down direction. Accordingly, each of the primary folded bodies of the bags 12 and 14 is formed in the shape of a strip of which the strip face faces in the up-and-down direction and the shape is elongated in forward and rearward directions and flat, as shown in FIGS. 12(a), (b), and (c).

Next, as shown in FIGS. 14, 15(a), and 15(b), the primary folded bodies of which the strip faces face in the up-and-down direction are secondarily folded so that the strip faces face in the right-and-left direction.

In the secondary folding, first, leading portions 12T and 14T of the primary folded bodies of the bags 12 and 14, which are closer to leading ends of the primary folded bodies than the connecting band 18, are separated from each other to the right and left in the shape of open legs in a direction indicated by arrows $A_1$ and $A_2$ shown in FIG. 13(a) so that the leading portions 12T and 14T and the connecting band 18 extend to the right and left sides so as to have a shape of a straight line at the front most ends of the primary folded bodies.

Reference numeral $L_9$ shown in FIG. 12(b) represents a folding line, which is used to fold the leading portions 12T and 14T in the shape of open legs.

Next, in the base portions 12U and 14U of the primary folded bodies of the bags 12 and 14, which are closer to base end parts of the primary folded bodies than the connecting band 18, the lower ends of the base portions 12U and 14U are separated from each other so as to be rotated in a direction indicated by arrows $A_3$ and $A_4$ shown in FIGS. 12(c) and 13(b) by 90° about the axial line extending in the extending direction. Accordingly, the strip faces face in the right-and-left direction.

In this case, the base end parts of the base portions 12U and 14U are folded along the lines $L_{10}$ and $L_{10}$ shown in FIG. 12(a) in a direction in which the base end parts approach each other. Then, the base end parts are overlapped on the base chamber 16, and the base chamber 16 also becomes flat.

In addition, while the base portions 12U and 14U are rotated, the leading portions 12T and 14T extending in the right-and-left direction are rotated rearwardly in a direction indicated by arrows $A_5$ and $A_6$ shown in FIG. 13(b) about the axial line extending in the extending direction. Then, the leading portions 12T and 14T are folded to the lower sides of the base portions 12U and 14U, and are overlapped on the lower surface of the base portions 12U and 14U that become flat in the right-and-left direction.

In this case, the leading ends of the base portions 12U and 14U (portions adjacent to the folding line $L_9$) are folded and inserted between the base portions 12U and 14U and the leading portions 12T and 14T. Reference numeral $L_{11}$ shown in FIGS. 12(b) and 13(a) represents a folding line, which is used to fold and insert the leading ends between the base portions 12U and 14U and the leading portions 12T and 14T.

FIGS. 14, 15(a), and 15(b) show a state in which the secondary folding is completed and then the airbag 10 becomes a secondary folded body. The secondary folded body is flat in the right-and-left direction, and is elongated in forward and rearward directions.

Next, the secondary folded body of the bags 12 and 14 is folded so as to be turned to the rear side of the airbag 10 (left side in FIG. 15(b)) about a vicinity of the front edge 16f (FIG. 15(b)) of the base chamber 16 in the direction indicated by an arrow $A_7$ (FIG. 15(b)). Accordingly, the secondary folded body becomes in a state shown in FIGS. 16 and 17.

Figure 18:
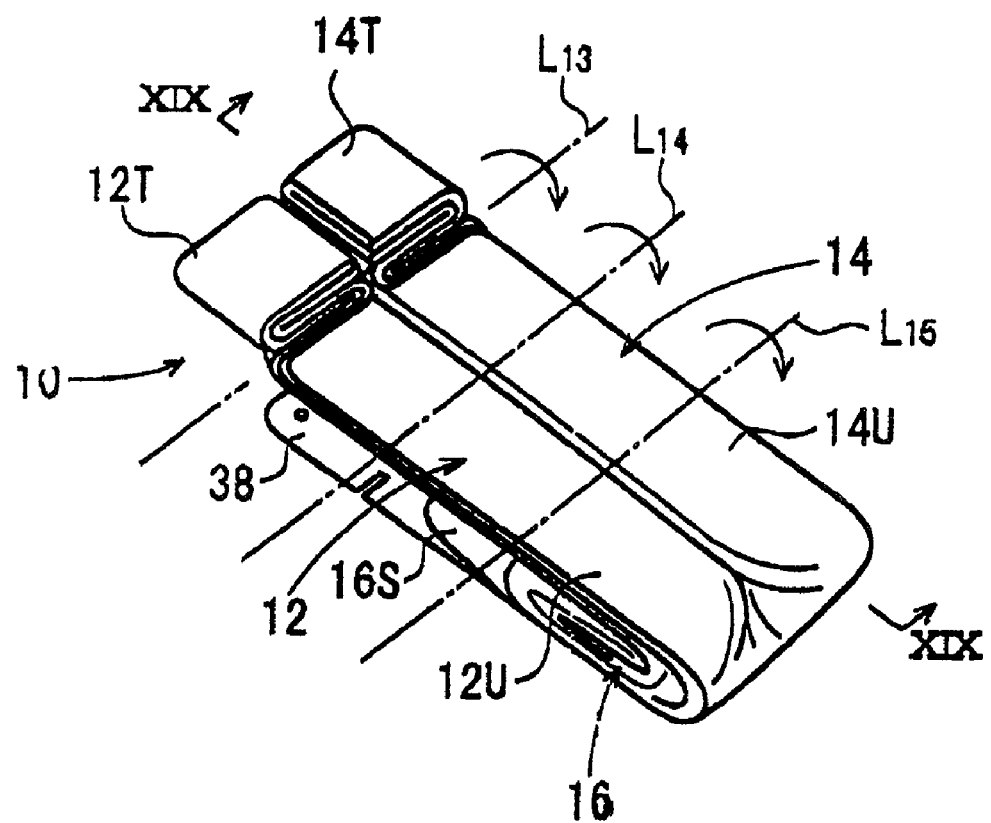
FIG. 18 is an explanatory view showing the process of folding the airbag in FIG. 1.
Figure 19A:
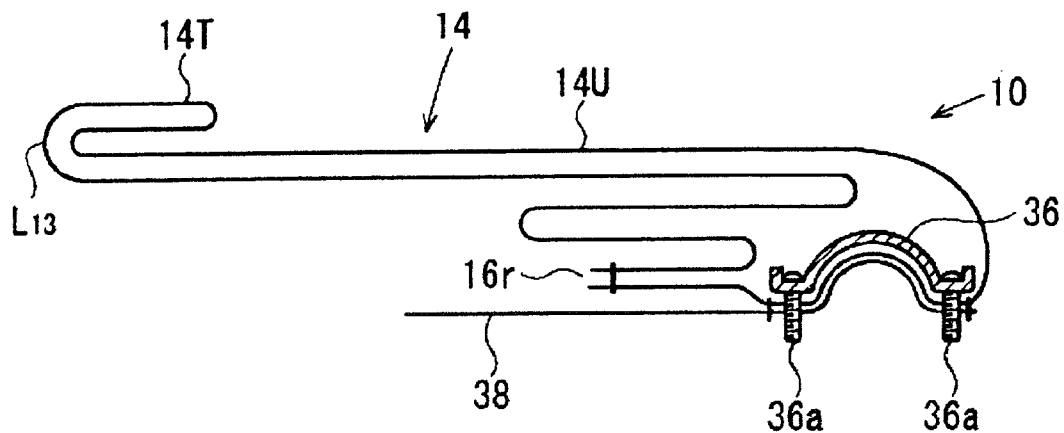
FIG. 19(a), 19(b), and 19(c) are explanatory views showing the process of folding the airbag in FIG. 1.
Figure 19B:
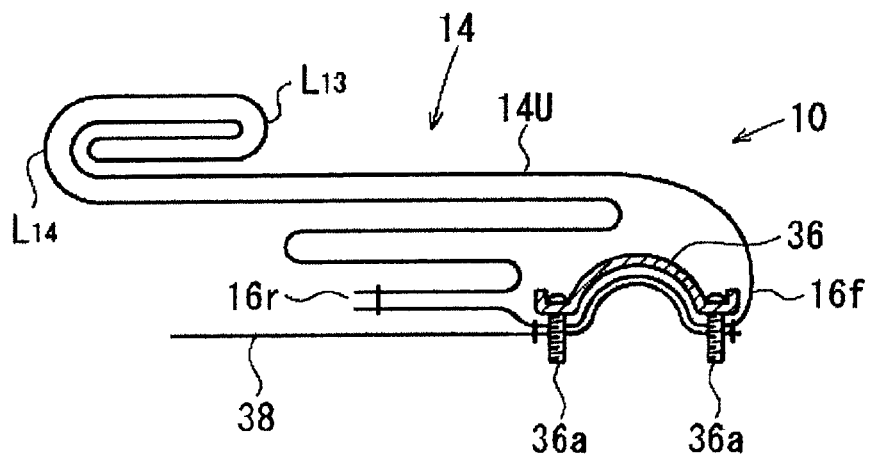
Figure 19C:
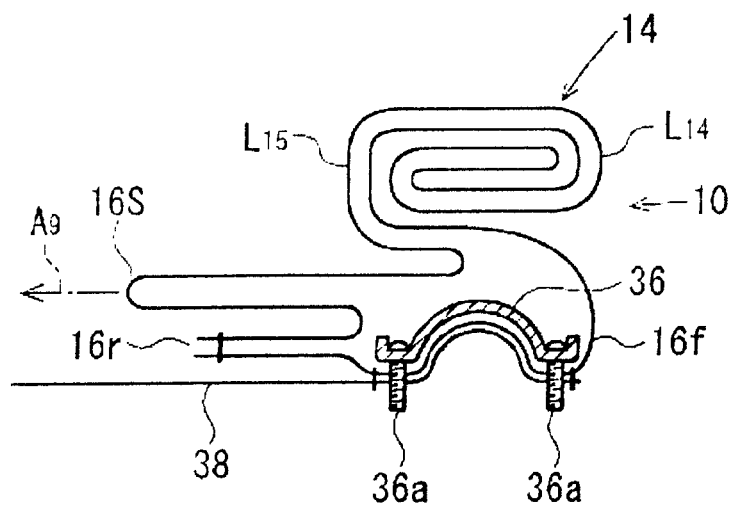

After that, as shown in FIGS. 16 to 18, in the leading portions 12T and 14T of the bags 12 and 14, portions extending in the right-and-left direction from both sides of the secondary folded body are folded along the line $L_{12}$ in the directions indicated by arrows $A_8$, respectively, and then are overlapped on the connecting band 18.

Next, the secondary folded body of the bags 12 and 14 is sequentially roll-folded along folding lines $L_{13}$, $L_{14}$, . . . , (only folding lines up to $L_{15}$ are shown in FIG. 18) that are arranged in the right-and-left direction by a predetermined width from the leading portions 12T and 14T toward the edge 16f of the base chamber 16 so as to be folded on the base portions 12U and 14U. Accordingly, the secondary folded body is roll-folded. Then, the folded roll of the bags 12 and 14 is overlapped on the base chamber 16. FIG. 19(c) shows the above-mentioned state.

As shown in FIG. 19(c), the base chamber 16 becomes a so-called "beaten state", and the folded roll of the bags 12 and 14 is placed on the base chamber 16. Then, a portion between the rear end 16r of the base chamber 16 and the base end parts of the bags 12 and 14 of the base panel 80, which constitutes the base chamber 16, becomes a loosened state. In the present embodiment, a portion 16S of the base chamber 16 in the vicinity of the rear end thereof in the base panel 80 is pulled rearwardly, and the base chamber 16 protrudes rearwardly by the loosened distance. (Hereinafter, the protruding portion of the base chamber 16 is represented by reference numeral 16S).

Figure 20:
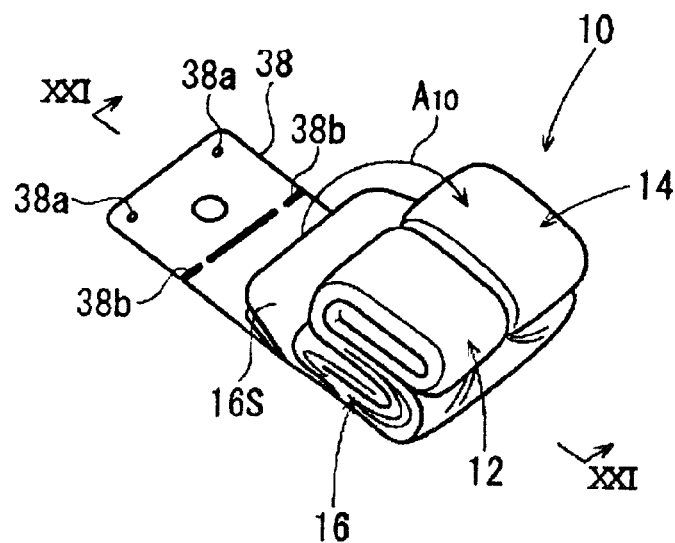
FIG. 20 is an explanatory view showing the process of folding the airbag in FIG. 1.
Figure 21:
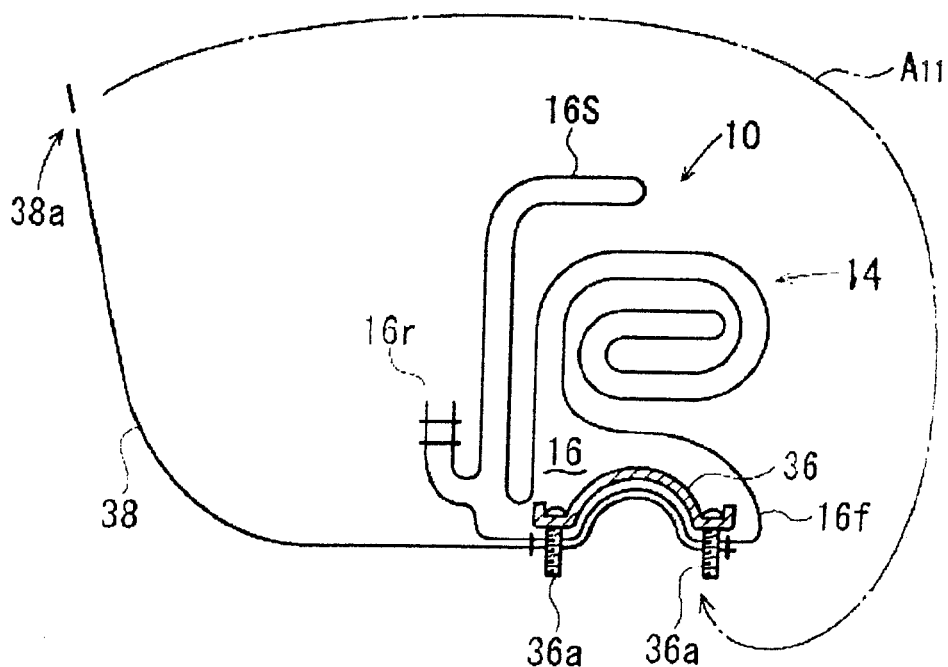
FIG. 21 is an explanatory view showing the process of folding the airbag in FIG. 1.

Meanwhile, the protruding portion 16S of the base chamber 16 is folded upward in the direction indicated by an arrow $A_{10}$ shown in FIG. 20, and is overlapped on the rear side face of the folded roll of the bags 12 and 14, thereby forming a final folded shape shown in FIG. 21. In addition, as shown in FIG. 21, the tip of the protruding portion 16S of the base chamber 16 wraps the upper portion of the folded roll of the bags 12 and 14.

Thereafter, in the direction indicated by an arrow $A_{11}$ shown in FIG. 21, the protector cloth 38 is pulled forwardly around the folded body of the airbag 10 such that it is covered on the folded body. Then, the stud bolts 36a extending from the bottom of the base chamber 16 are inserted through the insertion holes 38a, respectively, of the protector cloth 38 at the leading end, and thereby the protector cloth 38 is caught by the stud bolts 36a. As a result, the folded body of the airbag 10 is wrapped (retained in shape) by the protector cloth 38, completing the folding of the airbag 10, as shown in FIGS. 22(a) and 22(b).

If a vehicle equipped with an airbag device 1 encounters an emergency situation, the inflator 34 operates to discharge gas. As a result, gas is discharged into the base chamber 16 from the inflator 34. The gas from the inflator 34 flows into the left airbag section 12 and the right airbag section 14 from the base chamber 16. Then, this gas causes the left airbag section 12 and the right airbag section 14 to inflate on the left and right sides, respectively, in front of a passenger.

When the airbag 10 of the airbag device 1 begins to be inflated, the protector cloth 38 is ruptured along slits 38b by the inflation pressure of the airbag 10, thereby releasing the folding of the airbag 10. Next, the base chamber 16 is inflated, which pushes the roll-folded body of the left airbag section 12 and the right airbag section 14 out of the case 40 while pushing the door 2a of the inflator 34 open.

In the present embodiment, when the base chamber 16 is folded, the rear end 16r thereof is pulled out rearwardly and the pulled-out portion 16S thereof is overlapped on the rear side face of the folded roll. Accordingly, when the base chamber 16 is inflated, as shown in FIG. 24, the pulled-out portion 16S swells greatly on the rear side (vehicle front side) of the folded roll. Thereby, the folded roll is pushed out toward the passenger by the pulled-out portion 16S so that the left airbag section 12 and the right airbag section 14 are smoothly deployed toward the passenger.

Thereafter, the roll folding of the left airbag section 12 and the right airbag section 14 is loosened, and the left airbag section 12 and the right airbag section 14 are deployed toward the passenger while rolling out. In this embodiment, after the left airbag section 12 and the right airbag section 14 are secondarily folded so as to become flat in the right-and-left direction, the secondary folded body is wound from the leading end thereof toward the lower side to be roll-folded. Accordingly, the left airbag section 12 and the right airbag section 14 are rapidly deployed toward the passenger in the direction indicated by an arrow $A_{12}$ shown in FIG. 24.

Thereafter, the left airbag section 12 and the right airbag section 14 are inflated to the left and right, respectively, in front of a passenger, whereby the left airbag section 12 receives the left chest of a passenger and the right airbag section 14 receives the right chest of the passenger. Hard and strong ribs exist in the left and right chests. The left airbag section 12 and the right airbag section 14 receive and absorb an impact on the passenger through the ribs. Also, the space 13 exists between the leading ends of the inflated left and right airbag sections 12 and 14 so that the breastbones in the center of the passenger's chest faces the space 13. Thus, if the passenger's body rushes into the airbag 10, the breastbone region of the chest does not receive a reaction force too much from the airbag 10. As a result, a burden on the breastbones becomes small.

In this embodiment, in a state in which the airbag 10 is inflated, the spacing between the front most ends of the left airbag section 12 and the right airbag section 14 is set to 150 to 450 mm. Thus, the inflated left airbag section 12 directly faces a central region of the left chest, and the inflated left airbag section 14 directly faces a central region of the right chest. As a result, the region of the ribs of the upper half of the passenger's body is received very securely by the airbag 10.

Moreover, in this embodiment, the leading portions 12T and 14T of the left and the right airbag sections 12 and 14 are turned and inflated in such a manner that the leading portions separated from each other in the shape of open legs approach each other. Therefore, the left airbag section 12 approaches the left chest so as to receive the left chest of the passenger on the left in front of the passenger, and the right airbag section 14 approaches the right chest so as to receive the right chest of the passenger on the right in front of the passenger. As a result, a head of the passenger is also received between the bags 12 and 14 on the right and left in front of the passenger.

In the airbag 10 of the airbag device 1, the left airbag section 12 and the right airbag section 14 are folded to be a secondary folded body which is flat in the right-and-left direction and is elongated in forward and rearward directions. Then, the airbag sections 12 and 14 are finally folded so as to have a small width in forward and rearward directions. With this purpose, various folding methods may be employed as a final method of folding the airbag. It is possible to define the deployment direction of the left airbag section 12 and the right airbag section 14 depending on the vehicle model (an angle of an instrument panel 2 or a windshield 3) by selecting a proper folding method.

The embodiment is an example of the present invention, and the present invention is not limited thereto.

Although the secondary folded body of the left airbag section 12 and the right airbag section 14 is finally folded by the roll folding in the embodiment, the invention is not limited thereto. For example, the airbag may be finally folded by an accordion-like folding or the combination of the roll folding and the accordion-like folding.

The above embodiment is just an example, and the invention is not limited to the above embodiment.

For example, although the secondary folded body of the left airbag section 12 and the right airbag section 14 is a folded roll that is a final folded body, the final method of folding the airbag is not limited to the roll folding and the airbag may be finally folded by an accordion-like folding or the combination of the roll folding and the accordion-like folding.

The above embodiment illustrates an application of the invention to front passenger airbag devices of automobiles. However, the invention is naturally applicable to airbag devices for passengers other than the front passenger and to airbag devices for receiving passengers of high-speed mobile objects other than the automobiles.

What is claimed is:

1. An airbag for being deployed toward a vehicle occupant, the airbag comprising:
    a first lateral airbag section for being deployed in a rearward longitudinal direction toward one side of the vehicle occupant;
    a second lateral airbag section for being deployed in a rearward longitudinal direction toward the other side of the vehicle occupant;
    a first folded body portion of the first lateral airbag section including a first elongated body that is formed by folding of the first lateral airbag section about a plurality of fold lines that extend in the longitudinal direction to reduce a vertical height of the first lateral airbag section and a first leading portion extending substantially orthogonal to the first elongated body that is formed by folding the first elongated body about a fold line extending orthogonal to the longitudinal direction; and
    a second folded body portion of the second lateral airbag section including a second elongated body that is formed by folding the second lateral airbag section about a plurality of fold lines that extend in the longitudinal direction to reduce a vertical height of the second lateral airbag section and a second leading portion extending substantially orthogonal to the second elongated body that is formed by folding the second elongated body about a fold line extending orthogonal to the longitudinal direction.

2. The airbag of claim 1 wherein the first and second body portions each include tucked portions inserted between the first and second elongated bodies and the respective transversely extending first and second leading portions.

3. The airbag of claim 1 wherein the first and second leading portions are formed to extend orthogonal to the first and second elongated bodies by further folding each leading portion along a fold line oriented approximately 45 degrees from a line extending in the longitudinal direction.

4. The airbag of claim 3 wherein folding each leading portion along the approximately 45 degree fold line creates first and second tucked portions.

5. The airbag of claim 1 wherein the first and second body portions are L-shaped body portions formed by folding the first and second leading portions back away from each other and rotating the first and second leading portions 90 degrees.

6. The airbag of claim 5 further comprising a connector for interconnecting middle portions of the first and second lateral airbag sections and wherein the first and second leading portions are each folded back along the connector.

7. The airbag of claim 1 wherein a longitudinal portion of the first elongated body and a longitudinal portion of the second elongated body are initially parallel and then folded away from each other and substantially flattened when creating the first and second body portions.

8. The airbag of claim 1 wherein each leading portion is rotated 90 degrees along the fold line orthogonal to the longitudinal direction such that portions of the first and second elongated bodies overlap the leading portions.

9. The airbag of claim 1 wherein the first and second body portions are folded about a plurality of fold lines to form a compact folded body.

10. The airbag of claim 9 wherein the first and second body portions are folded back along a fold line to expose an opposite side of the first and second body portions in forming the compact folded body.

11. The airbag of claim 9 wherein the first and second body portions are at least partially roll-folded in forming the compact folded body.

12. The airbag of claim 9 wherein the first and second body portions are at least partially accordion-folded in forming the compact folded body.

13. The airbag of claim 9 further comprising a protector panel positioned around the compact folded body to cover the compact folded body and at least one viewing opening in the protector panel for viewing the compact folded body.

14. The airbag of claim 9 further comprising a base airbag section connected to the first and second lateral airbag sections, wherein the base airbag section is substantially flattened with the compact body generally located thereon.

15. The airbag of claim 14 wherein a flap portion of the base airbag section is pulled out to extend beyond a periphery of the overlying compact folded body and folded up alongside the compact folded body.

16. The airbag of claim 1 wherein the first and second lateral airbags are folded into first and second elongated bodies using a combination of roll folding and accordion folding.

17. An airbag comprising:
    a base airbag section having an enlarged rear portion; and
    first and second lateral airbag sections that are to be deployed in a rearward longitudinal direction and which are folded into first and second elongated bodies by folding each of the lateral airbag sections about a plurality of longitudinal fold lines to reduce a vertical height of each of the lateral airbag sections, with each elongated body roll folded from a leading end of the elongated body toward the base airbag section, with the first and second lateral airbag sections inflating subsequent to inflation of the rear portion, such that the rear portion causes the first and second lateral airbag sections to deploy towards first and second sides of a vehicle occupant.

18. The airbag of claim 17 wherein the enlarged rear portion includes a flap portion of the base airbag section folded along the roll folded first and second elongated bodies.

19. A method of manufacturing an airbag, the method comprising:
    forming a rear base section of the airbag;
    connecting first and second lateral airbag sections to the base airbag section forwardly thereof;
    folding both the first lateral airbag section and the second lateral airbag section about a plurality of longitudinally extending fold lines to form first and second elongated bodies having reduced vertical heights over the corresponding first and second lateral airbag sections; and
    folding the reduced height first and second elongated bodies into substantially L-shaped bodies.

20. The method of claim 19 wherein folding the first and second elongated bodies into substantially L-shaped bodies includes folding leading end portions of the first and second elongated bodies along back away from each other and then rotating each leading end portion 90 degrees.

21. The method of claim 19 wherein folding the first and second elongated bodies into substantially L-shaped bodies includes folding parallel longitudinal portions of the first and second elongated bodies away from each other and substantially flattening the longitudinal portions.

22. The method of claim 19 further comprising folding the first and second L-shaped bodies about a plurality of fold lines to form a compact folded body.

23. The method of claim 22 wherein folding the first and second L-shaped bodies to form the compact folded body includes partially roll-folding the first and second L-shaped bodies.

24. The method of claim 22 wherein folding the first and second L-shaped bodies to form the compact folded body includes partially accordion-folding the first and second L-shaped bodies.

* * * * *

UNITED STATES PATENT AND TRADEMARK OFFICE
CERTIFICATE OF CORRECTION

| | | |
|---|---|---|
| PATENT NO. | : 7,614,655 B2 | Page 1 of 1 |
| APPLICATION NO. | : 11/460764 | |
| DATED | : November 10, 2009 | |
| INVENTOR(S) | : Masahiro Hasebe | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 516 days.

Signed and Sealed this

Fourteenth Day of December, 2010

David J. Kappos
*Director of the United States Patent and Trademark Office*